United States Patent [19]
Ito et al.

[11] Patent Number: 6,070,425
[45] Date of Patent: Jun. 6, 2000

[54] AIR-CONDITIONING APPARATUS

[75] Inventors: Koichi Ito; Kazunori Saida, both of Kariya; Hiromi Tahara, Toyota; Kenji Suwa, Kariya, all of Japan

[73] Assignee: DENSO Corporation, Kariya, Japan

[21] Appl. No.: 09/127,369

[22] Filed: Jul. 31, 1998

[30] Foreign Application Priority Data

Aug. 11, 1997 [JP] Japan .................................. 9-216539
Feb. 3, 1998 [JP] Japan ................................. 10-022337

[51] Int. Cl.$^7$ .................................................... F25D 21/14
[52] U.S. Cl. ................................ 62/285; 62/407; 62/515; 62/509
[58] Field of Search .............................. 62/285, 407, 515, 62/509

[56] References Cited

U.S. PATENT DOCUMENTS

| | | |
|---|---|---|
| 4,385,505 | 5/1983 | Umezu . |
| 4,546,820 | 10/1985 | Whipple ..................................... 165/77 |
| 4,974,421 | 12/1990 | Kim ............................................ 62/272 |
| 5,195,332 | 3/1993 | Sullivan . |
| 5,199,276 | 4/1993 | Sullivan . |
| 5,279,360 | 1/1994 | Hughes et al. ............................ 165/111 |
| 5,303,563 | 4/1994 | Bishop et al. .............................. 62/382 |
| 5,664,430 | 9/1997 | Karman ...................................... 62/285 |
| 5,755,107 | 5/1998 | Shirota et al. .............................. 62/244 |

FOREIGN PATENT DOCUMENTS

| | | |
|---|---|---|
| 60-001023 | 1/1985 | Japan . |
| 1-153 322 | 6/1989 | Japan . |
| 8-295 128 | 11/1996 | Japan . |
| 10-129 246 | 5/1998 | Japan . |
| 0 831 088 | 3/1960 | United Kingdom . |
| 813088 | 3/1960 | United Kingdom . |
| 1328667 | 8/1973 | United Kingdom . |
| 2173291 | 10/1986 | United Kingdom . |

*Primary Examiner*—Henry Bennett
*Assistant Examiner*—Mark Shulman
*Attorney, Agent, or Firm*—Harness, Dickey & Pierce, PLC

[57] ABSTRACT

In an air conditioning apparatus, an evaporator is disposed in an air-conditioning case to be inclined relative to a horizontal direction and to form a lower space below the evaporator. Air flows through the evaporator from a lower side toward an upper side thereof in the air-conditioning case. The lower space is partitioned by a partition member into an air-blown space and a drain space, and a drain guide member is disposed in the drain space to approximately contact a lower end portion of the inclined evaporator, where condensed water is gathered. Therefore, it can prevent air from hitting from below against the lower end portion of the evaporator. Consequently, the condensed water that has been gathered at the lower end portion of the inclined evaporator can be discharged rapidly along the drain guide member without being affected by the flow of air, and drips to a bottom surface of the air-conditioning case. Thus, draining-efficiency of condensed water generated on the evaporator can be improved effectively.

18 Claims, 16 Drawing Sheets

AIR-CONDITIONING APPARATUS

CROSS-REFERENCE TO RELATED APPLICATION

This applicant is related to and claims priority from Japanese Patent Applications No. Hei. 9-216539 filed on Aug. 11, 1997, and No. Hei. 10-22337 filed on Feb. 3, 1998, the contents of which are hereby incorporated by reference.

BACKGROUND OF THE INVENTION

1. Field of the Invention:

The present invention relates to an air-conditioning apparatus in which a cooling heat exchanger is inclined so that air flows upwardly in the cooling heat exchanger from a lower side thereof.

2. Description of Related Art:

Conventionally, in an air-conditioning apparatus for a vehicle described in U.S. Pat. No. 5,755,107, an evaporator (i.e., cooling heat exchanger) is inclined and air flows through the evaporator upwardly from a lower side, to reduce a size of an air-conditioning unit. In the conventional apparatus, a plurality of drain guide members for draining condensed water generated on the evaporator are provided to approximately contact an outside surface of a core portion of the evaporator.

In the conventional air-conditioning apparatus, because air flows upwardly from below in the evaporator, condensed water does not directly drop with its own weight, but flows down along the surface of the evaporator and gathers at a lower end portion of the inclined evaporator. Thereafter, the condensed water is discharged to the outside of the vehicle through the outer surface of the drain guide member. In the conventional apparatus, the drain guide member is cross-shaped to rapidly drop of the condensed water from the lower end portion of the inclined evaporator.

However, because a plurality of drain guide members are arranged at spaces, air flowing upward hits the lower end portion of the inclined evaporator and condensed water on the lower end portion of inclined evaporator is blown upwardly with the flow of air. Therefore, the condensed water is blown off to deteriorate the drain performance of the condensed water. Further, because the drain guide members are located below the core portion, the flow of air passing through the evaporator is disturbed. Therefore, the quantity of air blown toward a passenger compartment is insufficient when a large quantity of air is needed during a hot summer season.

SUMMARY OF THE INVENTION

In view of the foregoing problems, it is a first object of the present invention to provide an air-conditioning apparatus in which a cooling heat exchanger is disposed obliquely, so that air flows upward in the cooling heat exchanger from below while drain-performance of condensed water generated in the cooling heat exchanger is improved.

It is a second object of the present invention to provide an air-conditioning apparatus in which a cooling heat exchanger is disposed obliquely, so that air flows upward in the cooling heat exchanger while the quantity of air passing through the cooling heat exchanger is increased.

According to a first aspect of the present invention, in an air-conditioning apparatus, a cooling heat exchanger is disposed in an air-conditioning case obliquely relative to a horizontal direction to have an inclined bottom surface and to form a lower space below the inclined bottom surface of the cooling heat exchanger within the air-conditioning case. A drain guide member for guiding condensed water generated on the cooling heat exchanger to an inner bottom of the air-conditioning case is disposed in the lower space to approximately contact a lower end side of the inclined bottom surface of the cooling heat exchanger, and a partition member is disposed in the lower space at an upper end side of the inclined bottom surface from the drain guide member. The partition member extends in an arrangement direction of the drain guide member to cover the drain guide member. Because the partition member extends in the arrangement direction of the drain guide member to cover the drain guide member, it becomes hard that air hits against the lower end side of the inclined bottom surface of the cooling heat exchanger, where the condensed water gathers. Therefore, the condensed water that has been gathered on the lower end side of the inclined bottom surface of the cooling heat exchanger can drip fast without being affected by air flow. Consequently, it is possible to drain the condensed water more effectively.

Preferably, the lower space within the air-conditioning case has a drain passage for leading the condensed water, dropped to an upper end side of the inclined bottom surface from the partition member, toward the drain guide member. The drain passage is formed by a lower end of the partition member and an inner bottom of the air-conditioning case. Thus, condensed water dripped to the upper end side of the inclined bottom surface of the cooling heat exchanger is introduced to a side of the drain guide member through the drain passage, and can be guided smoothly to the inner bottom of the air-conditioning case.

More preferably, the partition member is disposed in the lower space to separate the lower space into an air-blown space through which air flows, and a drain space for guiding the condensed water. Because the lower space is separated by the partition member into the air-blown space and the drain space, it becomes possible to prevent air from hitting on the lower end side of the inclined bottom surface of the cooling heat exchanger, where the condensed water gathers. Therefore, the condensed water that has gathered at the lower end side of the inclined bottom surface of the cooling heat exchanger drips fast to the inner bottom of the air conditioning case absolutely without being affected by air. As a result, the draining-performance of the condensed water can be further improved.

Still more preferably, the drain guide member is disposed under a tank of the cooling heat exchanger to approximately contact the tank. Therefore, the drain guide member does not interfere with the flow of air passing through a core portion of the cooling heat exchanger. Thus, the volume of air passing through the cooling heat exchanger can be increased. Further, the partition member is disposed to be approximately adjacent to a boundary between the core portion and the tank. Thus, it is possible to prevent air from hitting against the tank while preventing the partition member from reducing the quantity of air passing through the cooling heat exchanger. Accordingly, draining-efficiency of the condensed water can be improved without deteriorating the cooling performance in the cooling heat exchanger.

According to a second aspect of the present invention, a cooling heat exchanger is disposed in an air-conditioning case obliquely relative to a horizontal direction to have an inclined bottom surface, and to form a lower space below the inclined bottom surface of the cooling heat exchanger within the air-conditioning case. The cooling heat exchanger is inclined relative to the horizontal direction in the air-conditioning case in such a manner that the tank is positioned at a lower side in inclination. Further, a drain guide member for guiding condensed water generated on the cooling heat exchanger to an inner bottom of the air-conditioning case is disposed in the lower space to approximately contacts a bottom of the tank portion. Thus, the drain guide member does not disturb the flow of air passing through the cooling heat exchanger and the quantity of air passing through the cooling heat exchanger can be increased.

Preferably, the drain guide member is disposed to approximately contact a boundary between the core portion and the tank. Therefore, the drain guide member does not disturb the flow of air passing through the cooling heat exchanger and draining-effect of condensed water can be further improved.

More preferably, the lower space within the air-conditioning case has a drain passage for leading the condensed-water, dropped to an upper end side of the inclined bottom surface from the drain guide member, toward a lower end side of the inclined bottom surface from the drain guide member. Thus, condensed water dripped to the upper end side of the inclined bottom surface of the cooling heat exchanger can be guided smoothly to the inner bottom of the air-conditioning case through the drain passage and the outer surface of the drain guide member.

BRIEF DESCRIPTION OF THE DRAWINGS

Additional object and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are hereinafter described with reference to the accompanying drawings.

A first preferred embodiment of the present invention will be now described with reference to FIGS. 1–9.

Figure 1:
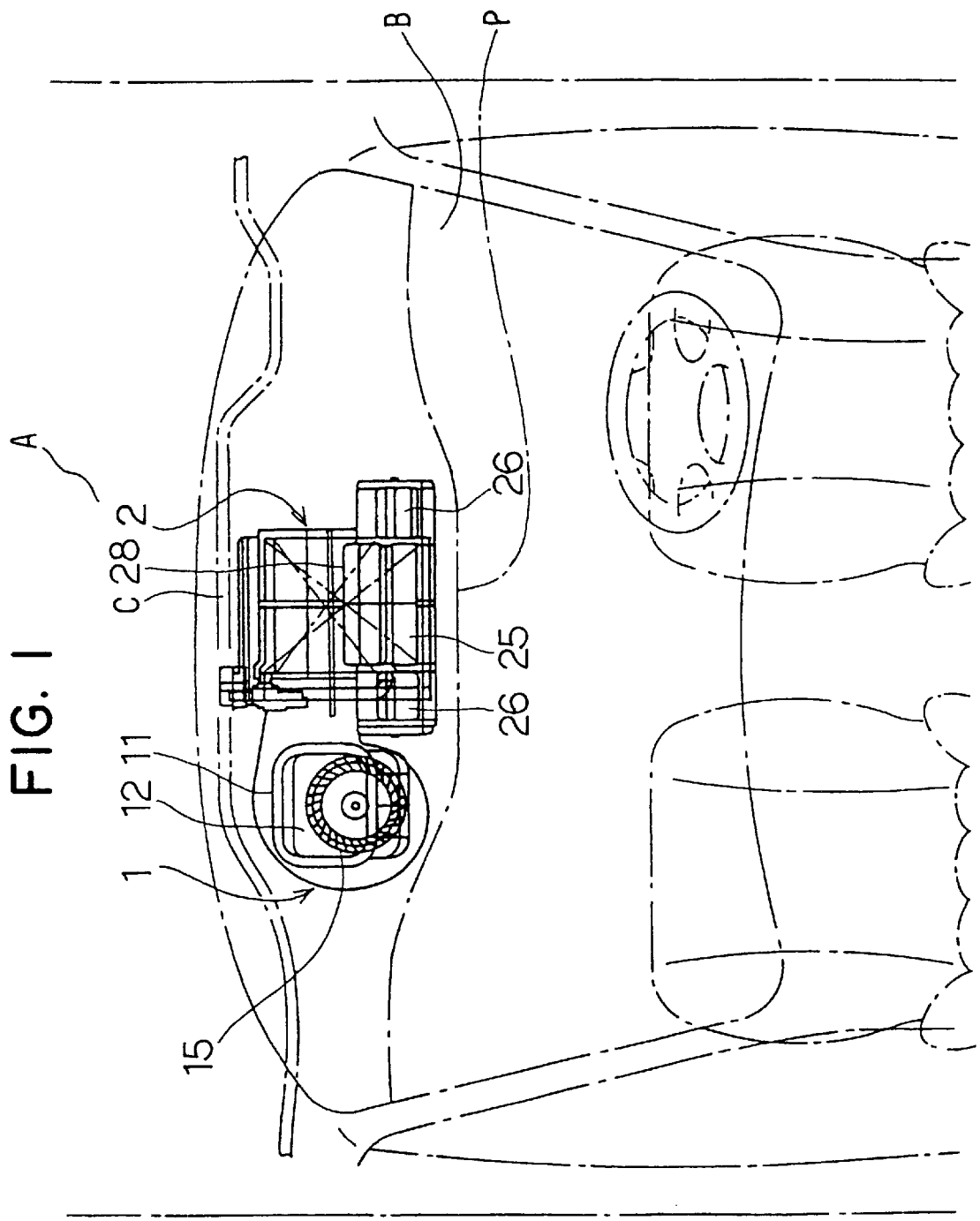
FIG. 1 is a view showing an air-conditioning apparatus mounted on a vehicle according to a first preferred embodiment of the present invention.
Figure 2:
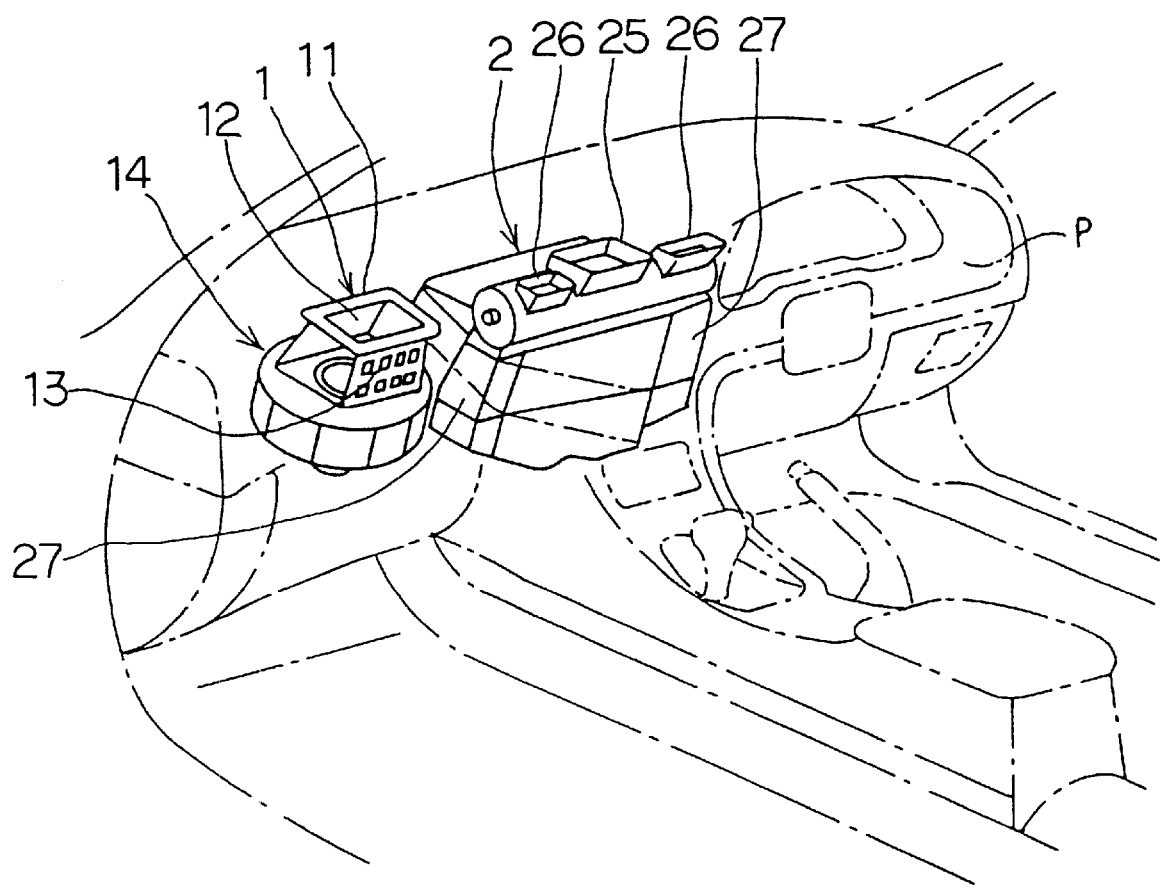
FIG. 2 is a view showing the air-conditioning apparatus mounted on a vehicle according to the first embodiment.

In FIGS. 1 and 2, an engine compartment A and a passenger compartment B are separated by a partition plate C (e.g., a fire wall produced of an iron plate). A blower unit 1 of an air-conditioning apparatus is mounted in the passenger compartment B to be shifted in a width direction of the vehicle from a central part of an instrument panel P. In the first embodiment, the blower unit 1 is shifted to the left side in the width direction of the vehicle.

The blower unit 1 has an inside-outside air changeover box 11 in an upper part, for changing over between inside air (i.e., air inside the passenger compartment) and outside air (i.e., air outside the passenger compartment) to be introduced therein. The inside-outside air changeover box 11 is provided with an outside air inlet 12 and an inside air inlet 13, and the outside air inlet 12 and the inside air inlet 13 are opened and closed by an inside-outside air changeover door.

Figure 3:
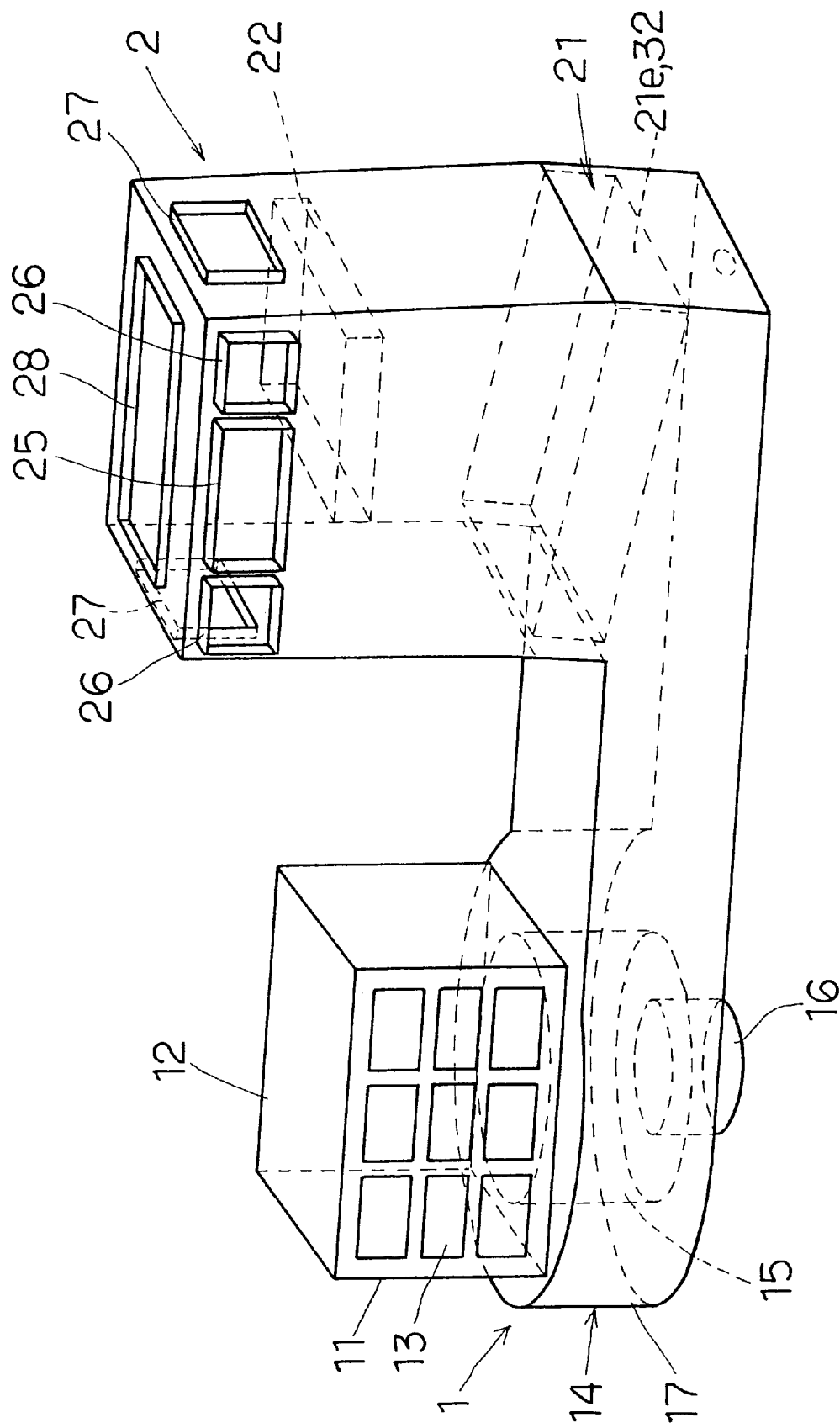
FIG. 3 is a schematic view showing an entire constitution of the air-conditioning apparatus according to the first embodiment.

Under the inside-outside air changeover box 11, a blower 14 is disposed as shown in FIG. 3. The blower 14 is comprised of a centrifugal multi-blade fan (sirocco fan) 15, a fan driving motor 16, and a scroll casing 17. A rotating shaft of the fan 15 is disposed to extend in an approximately vertical direction (i.e., up-down direction of the vehicle). Therefore, with the rotation of the fan 15, air is sucked from the insideoutside air changeover box 11, is introduced into the blower 14 through a bell mouth-shaped suction port provided at the upper part of the scroll casing 17, and is blown in an approximately horizontal direction (i.e., from left to right of the passenger compartment B in FIG. 1) towards an outlet of the scroll casing 17.

On the other hand, an air-conditioning unit 2 is disposed approximately in the central part of the instrument panel P in the passenger compartment B. In the air-conditioning unit 2, an evaporator (i.e., cooling heat exchanger) 21 of a refrigeration cycle is disposed approximately horizontally (i.e., slightly inclined), and air introduced from the blower unit 1 passes through the evaporator 21 from a lower side to an upper side thereof. A heater core (i.e., heating heat exchanger) 22 is disposed approximately horizontally on a downstream air side of the evaporator 21 (i.e., upper side in the passenger compartment ). The heater core 22 heats air blown from the evaporator 21 by using an engine-cooling water (i.e., warm water) as a heating source. At the upper part (i.e., on the downstream air side) of the heater core 22 in an air-conditioning case, a plurality of air passages are provided. That is, the air passages include a center face air passage 25, a side face air passage 26, a foot air passage 27, and a defroster air passage 28. The center face air passage 25 communicates with a center face air vent at which air is blown out toward the head portion of a passenger in the passenger compartment. The side face air passage 26 similarly communicates with a side face air vent at which air is blown toward a side windshield of the vehicle. The foot air passage 27 communicates with a foot air vent at which air is blown out towards the foot portion of the passenger in the passenger compartment. The defroster air passage 28 communicates with a defroster air vent at which air is blown out towards a windshield of the vehicle.

At the upper part of the heater core 22 in the air-conditioning unit 2, a mode switching door (e.g., a plate-like door, a rotary door having a circular outer peripheral surface, a film-like door) is disposed to open and close the plurality of air passages 25, 26, 27 and 28. The plurality of air passages 25, 26, 27 and 28 are opened and closed by the door so that a plurality of air outlet modes, such as a face mode, a bi-level mode, a foot mode, a defroster mode, and a foot/defroster mode, can be selected. In the first embodiment, the air passages are slightly modified in FIGS. 1, 2 and 3. However, those are not major portions of the present invention; and therefore, differences thereof are not explained.

In the first embodiment of the present invention, a hot water control valve (not shown) is provided as air-conditioning temperature control means for controlling a flow rate of hot water flowing into the heater core 22. The flow rate of hot water flowing into the heater core 22 is thus controlled by the hot water control valve to control the temperature of air blown into the passenger compartment.

Figure 4:
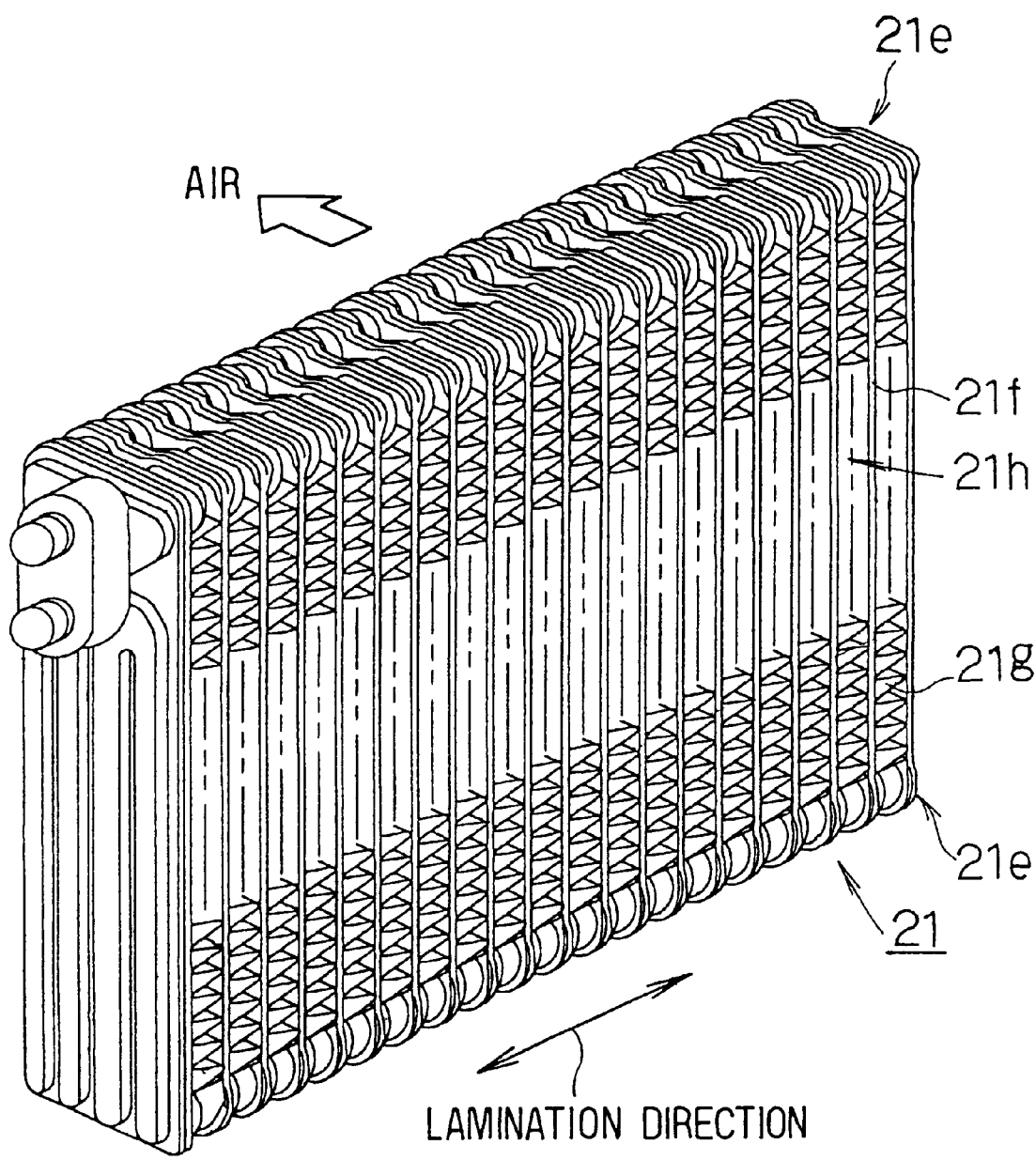
FIG. 4 is a schematic view showing an evaporator of the air-conditioning apparatus according to the first embodiment.

As shown in FIG. 4, the evaporator 21 is a laminated type in which a plurality of tubes 21f are laminated by anticorrosive metal sheets such as aluminum sheets in a lateral direction (i.e., lamination direction) in the drawing. The evaporator 21 includes a core portion 21h, and the core portion 21h is formed by the tubes 21f laminated to each other in the lamination direction and corrugated fins 21g arranged between adjacent tubes 21f. In the evaporator 21, air passing through the corrugated fins 21g is heat-exchanged with refrigerant flowing through the tubes 21f so that air is cooled. On both opposite ends of the core portion 21h, there is arranged the tank portion 21e for distributing the refrigerant to the tubes 21f and for joining the refrigerant from the tubes 21f.

Figure 5:
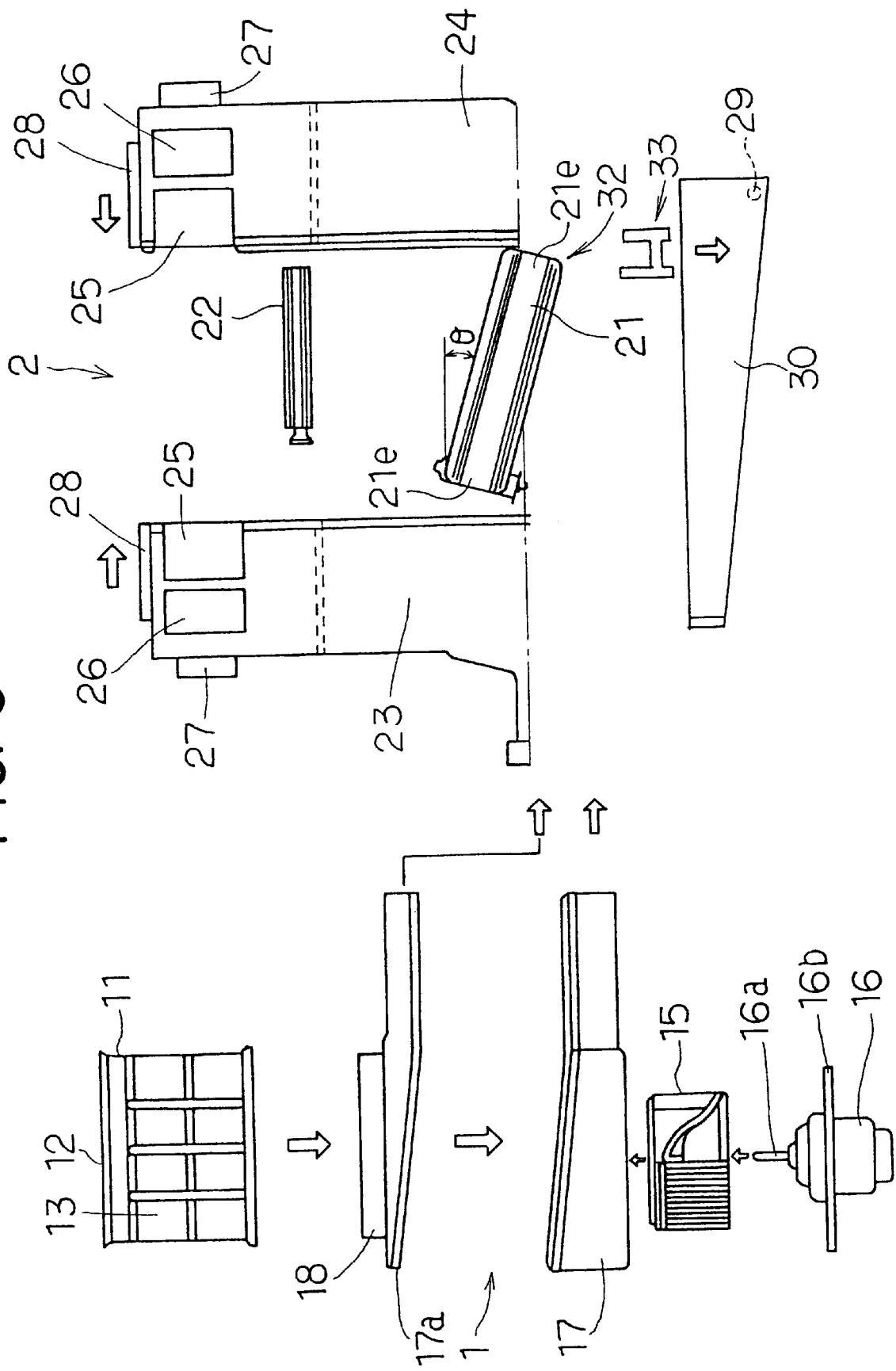
FIG. 5 is a disassembled view of the air-conditioning apparatus according to the first embodiment.

FIG. 5 shows a disassembled structure of the air-conditioning apparatus in the first embodiment. As shown in FIG. 5, in the blower unit 1, a casing is a transverse separate type divided horizontally into three parts having dividing surface in a horizontal direction. That is, the casing is divided horizontally into the inside-outside air changeover box 11, the scroll casing 17, and an upper cover 17a of the scroll casing 17. The upper cover 17a is provided with a bell-mouthed suction port 18. The fan 15 of the blower 14 is integrally connected with a rotating shaft 1a of the motor 16, and then is disposed within the scroll casing 17. A flange portion 16b of the motor 16 is attached and fixed to the scroll casing 17. Next, the upper cover 17a is attached to an upper end portion of the scroll casing 17; and the inside-outside air changeover box 11 is disposed above the bell-mouthed suction port 18 of the upper cover 17a, so that the upper cover 17a and the inside-outside air changeover box 11 are integrally assembled.

On the other hand, in the air-conditioning unit 2, the casing is divided into three parts: two vertically separated left and right casings 23 and 24 each having a dividing surface in a vertical direction, and a cup-shaped lower casing 30. The evaporator 21, the heater core 22, doors, and the like are disposed in either one of the two vertically separated casings 23 and 24 and then the other casing is connected to the one casing by connecting means (e.g., metal spring clips, screws).

In the air-conditioning unit 2, the evaporator 21 is supported on the inner wall surface of the lower casing 30 by a partition member 33a and a drain guide member 33b.

The inside-outside air changeover box 11, the scroll casing 17, the upper cover 17a, and the casings 23 and 24 are formed of resin having a certain degree in elasticity, such as the ABS resin.

In the above-described air-conditioning unit 2, the evaporator 21 is arranged approximately horizontally or is arranged slightly inclined from the horizontal direction so that air is blown upwardly from below the evaporator 21. Therefore, air flows in the evaporator 21 to be opposite to a fall direction of condensed water.

In the first embodiment, to improve the draining-efficiency of condensed water generated in the evaporator 21, firstly, the evaporator 21 is arranged slightly inclined from the horizontal direction. That is, as shown in FIGS. 3 and 5, the evaporator 21 is disposed to be inclined downward by a little angle towards the forward side (i.e., to the right side in FIGS. 3 and 5) of flow of air being blown from the blower 14. Here, the inclination angle θ of the evaporator 21 is set within a range of 10–30 deg. (e.g., 18 deg. in the first embodiment) to reduce the water capacity of the evaporator 21 itself. Secondly, each tube 21f of the evaporator 21 is arranged to extend in the same direction as the flow direction of air (i.e., in the direction from left side to right side in FIGS. 3 and 5). Thus, the condensed water is smoothly moved by the air flow on the surfaces of the tubes 21f towards the inclined forward end (i.e., right-side end in FIGS. 3 and 5). Here, condensed water generated on the evaporator 21 is discharged to the outside through a condensed-water drain pipe 29 located under a lower end portion 32 of the inclined evaporator 21. The drain pipe 29 is integrally formed with a bottom portion of the lower casing 30 made of resin.

Next, operation of the air-conditioning apparatus having the above-described structure of the first embodiment will be now explained.

In FIG. 3, air introduced from the inside-outside air changeover box 11 is blown approximately horizontally by the fan 15 within the scroll casing 17, then flows into the lower part of the evaporator 21. Thereafter, air is directed upwardly and passes through the evaporator 21 to be dehumidified and to be cooled, and further flows upwardly into the heater core 22 where air is heated.

In the first embodiment, the hot water control valve is employed as temperature control means, and controls the quantity of hot water to be supplied to the heater core 22. That is, a flow control-reheat system is used to obtain a predetermined temperature of air blown toward the passenger compartment. Air reheated to a predetermined temperature in the heater core 22 is distributed to predetermined air vents by the mode switching doors disposed above the heater core 22.

Next, the draining-efficiency of condensed water generated on the evaporator 21, which is a major portion of the present invention, will be now described. In the first embodiment, a drain-improving portion 33 having a H-shaped cross-section is assembled in the lower casing 30 as shown in FIG. 5. Details of the drain-improving portion 33 is shown in FIGS. 6 to 8.

Figure 6:
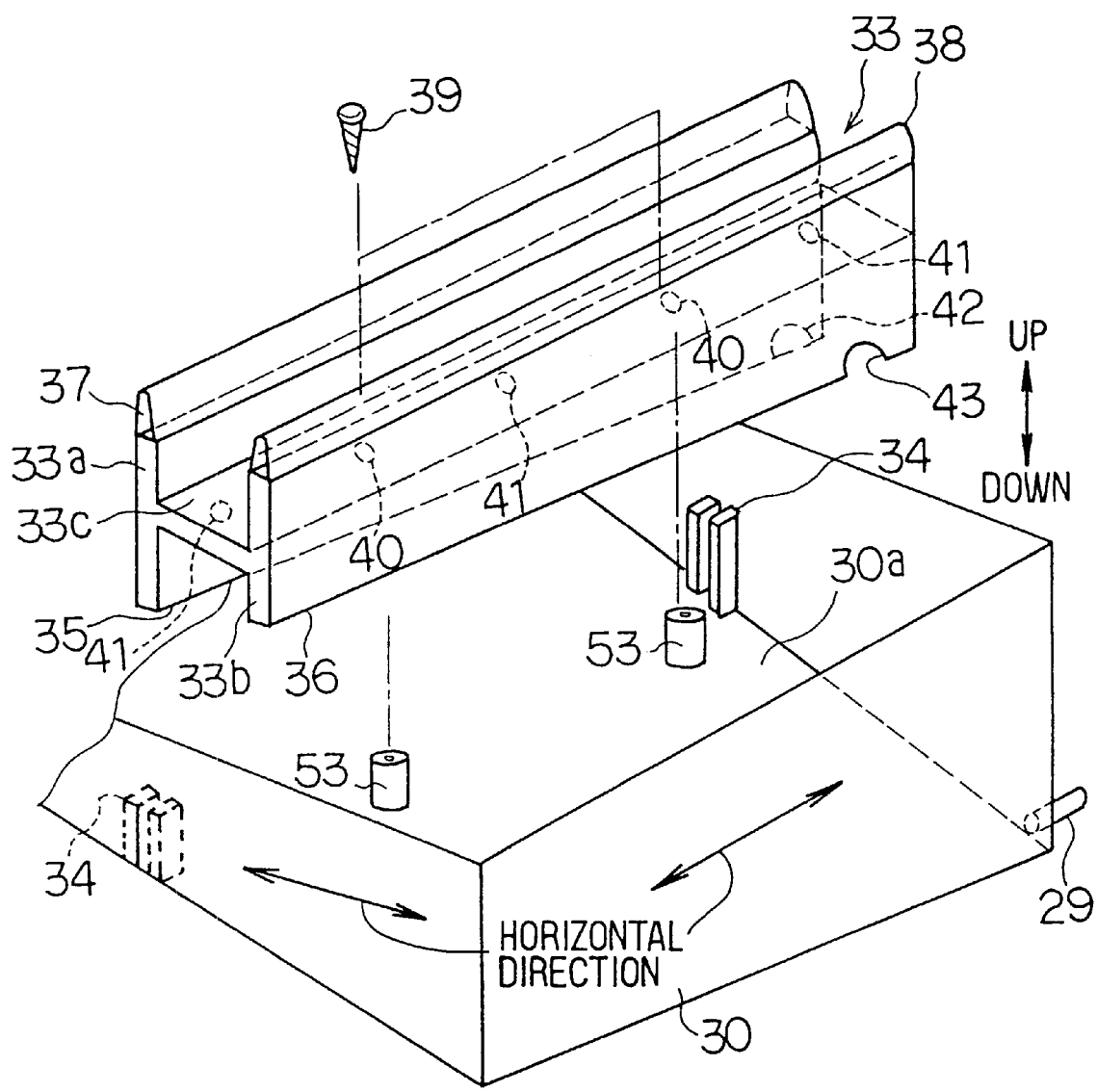
FIG. 6 is a disassembled view showing a drain-improving portion and a lower casing according to the first embodiment.
Figure 7:
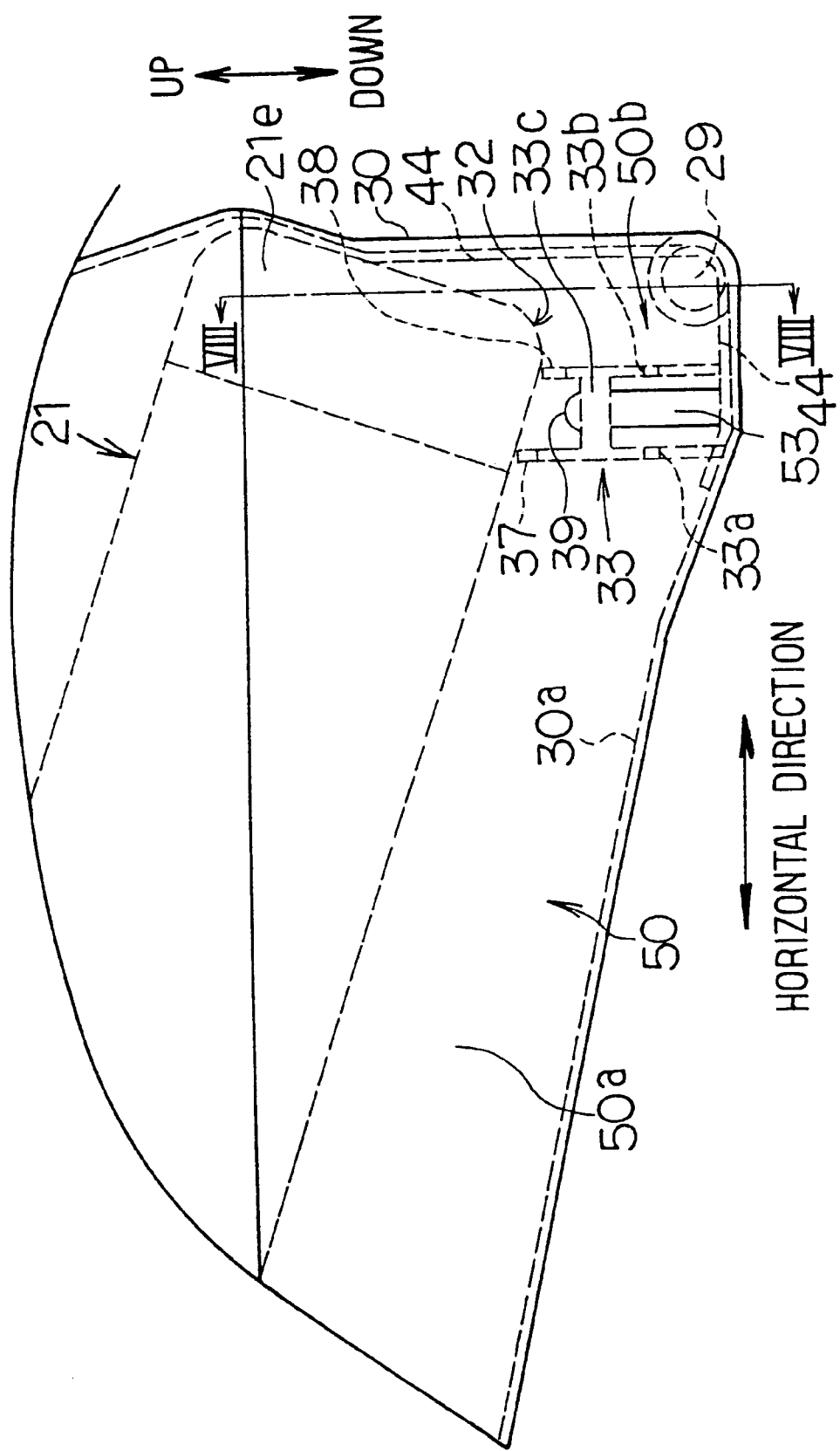
FIG. 7 is a perspective view showing the drain-improving portion disposed in the lower casing according to the first embodiment.

FIG. 6 is an exploded view of the drain-improving portion 33 removed from the lower casing 30. FIG. 7 is a perspective view in which the drain-improving portion 33 and the evaporator 21 are disposed within the lower casing 30. FIG. 8 is a cross-sectional view taken along line VIII-VIII in FIG. 7, and FIG. 9 is a top view of the drain-improving portion 33 mounted in the lower casing 30 in FIG. 6.

Figure 8:
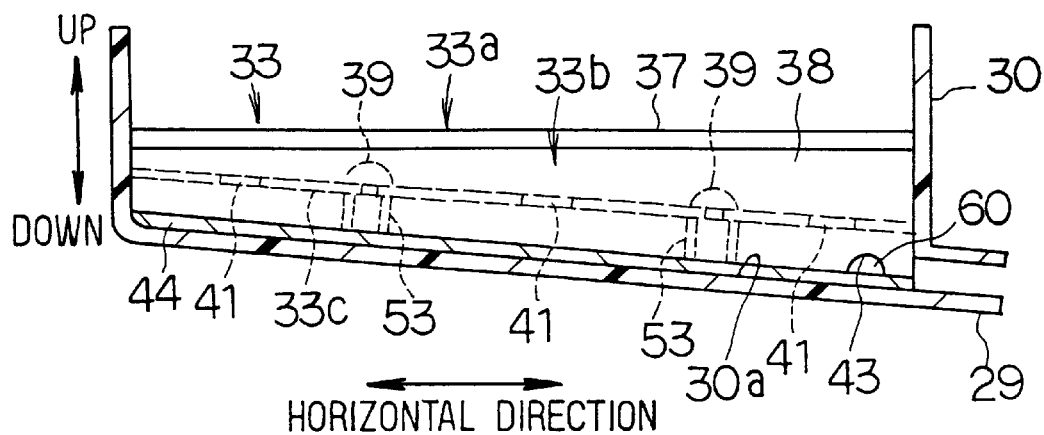
FIG. 8 is a cross-sectional view taken along line VIII—VIII in FIG. 7.
Figure 9:
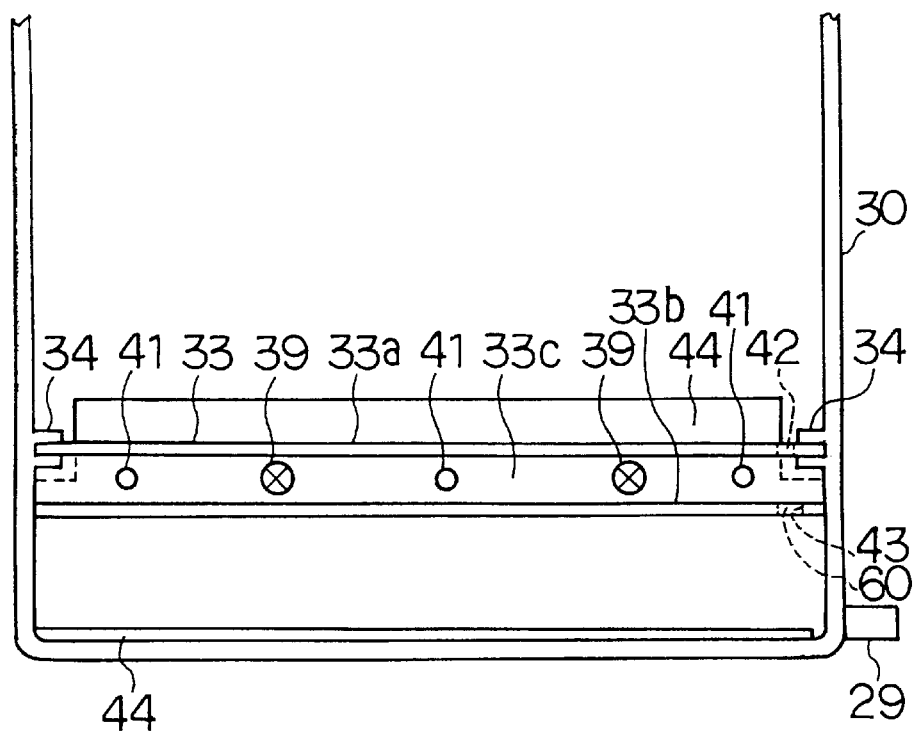
FIG. 9 is a top view of FIG. 6.

In the lower casing 30, a bottom surface 30a is formed to be inclined downwardly as shown in FIGS. 6 and 8. Thus, the condensed water that is dripped to the bottom surface 30a is collected to a part where the condensed-water drain pipe 29 is formed. A rail-like guide portion 34 is integrally formed with the lower casing 30 to guide and support the drain-improving portion 33 as shown in FIG. 6. Furthermore, in the lower casing 30, there is formed a boss 53 which is engaged with a screw 39 for fastening the drain-improving portion 33.

The drain-improving portion 33 is made of a resinous material such as polypropylene. The drain-improving portion 33 includes the partition member 33a formed in a plate like, the drain guide member 33b formed in a plate like, and a connecting portion 33c connecting the partition member 33a and the drain guide member 33b.

Each of the partition member 33a and the drain guide member 33b is formed to expand width thereof as they go towards the right side in FIGS. 6 and 8. Firstly, it is because the bottom surface 30a of the lower casing 30 is inclined downwardly, and a lower end portion 35 of the partition member 33a and a lower end portion 36 of the drain guide member 33b are fixed to the bottom surface 30a of the lower casing 30. Secondly, it is for the purpose that the upper end portion 37 of the partition member 33a and the upper end portion 38 of the drain guide member 33b extend approximately horizontally to contact the lower end portion 32 of the evaporator 21.

In the first embodiment, the upper end portion 37 of the partition member 33a is made of elastomer rubber to be elastically deformable. Also, the upper end portion 38 of the drain guide member is made of elastomer rubber to be elastically deformable.

On the right-hand side of the lower end portion 35 of the partition member 33a in FIG. 6, a semi-circular recess portion 42 is formed. Furthermore, on the right-hand side of the lower end portion 36 of the drain guide member 33b in FIG. 6, a semi-circular recess portion 43 is formed. In the connecting portion 33c, a hole 40 where a screw 39 is inserted is provided. Also, in the connecting portion 33c, a plurality of water drain holes 41 are formed in alignment with the hole 40 in a longitudinal direction of the connecting portion 33c. Then, after insertion of the partition member 33a into the guide portion 34, the screw 39 is installed into the boss 53 through the hole 40, thereby fixedly attaching the drain-improving portion 33 into the lower casing 30.

In the first embodiment, an insulator 44 (shown in FIGS. 7, 8 and 9) which is a heat-insulating member is disposed along the bottom surface 30a within the lower casing 30. Concretely, the insulator 44 is held between the drain-improving portion 33 and the bottom surface 30a as shown in FIGS. 7 and 8. The insulator 44 is not only disposed on the bottom surface 30a but extends upwardly along an inside wall surface of the lower casing 30 as shown in FIG. 7. Furthermore, the insulator 44 prevents dew formation on the outside surface of the lower casing 30 due to cooling operation of the evaporator 21.

After the attachment of the drain-improving portion 33 in the lower casing 30 as described above, the evaporator 21 is disposed inside of the lower casing 30 in such a manner that the tank portion 21e of the evaporator 21 is positioned on the drain-improving portion 33 as shown in FIG. 7. That is, the evaporator 21 is disposed inside the lower casing 30 in such a manner that the tank portion 21e forms the lower end portion 32 of inclination.

The upper end portions 37, 38 are elastically deformed to contact the tank portion 21e of the evaporator 21. The partition member 33a, as shown in FIG. 7, is disposed at an inclination upper end side of the evaporator 21 from the drain guide member 33b. The partition member 33a extends continuously to the entire width range of the evaporator 21 in a width direction perpendicular to both of an inclination direction from the upper end side towards the lower end side of the inclined evaporator 21 and a flow direction of air passing through the evaporator 21.

In other words, the partition member 33a continuously extends in an arrangement direction of the drain guide member 33b in such a manner as to cover the drain guide member 33b. The arrangement direction of the drain guide member is an extension direction (i.e., the longitudinal direction of vehicle) of a single plate of the drain guide member 33b. For instance, when a plurality of drain guide members 33b are disposed at spaces, the arrangement direction is a direction of arrangement of the plurality of drain guide members.

When the evaporator 21 is arranged within the lower casing 30, condensed water generated in the evaporator 21 flows from the upper end side (i.e., left side in FIG. 7) of the evaporator 21 toward the lower end side (right side in FIG. 7) of the evaporator 21; and therefore, the condensed water gathers at the lower end portion 32 of the evaporator 21. Thereafter, the condensed water drips to the bottom surface 30a of the lower casing 30 through the lower space 50 below the evaporator 21.

The lower space 50 shown in FIG. 7 is provided under the evaporator 21, and is partitioned by the partition member 33a into an air-blown space 50a where air blown from the blower unit 1 flows and a drain space 50b formed on a downstream air side of the air-blown space 50a. Therefore, the condensed water gathering to the lower end portion 32 of the inclined evaporator 21 drops to the bottom surface 30a through the drain space 50b. In the drain space 50b, the drain guide member 33b is disposed to be nearly contact (fully contact in first embodiment) the lower end portion 32 of the inclined evaporator 21.

Next, behavior of the condensed water in the air conditioning unit 2 according to the first embodiment will be now described. The condensed water is generated in the whole body of the evaporator 21. However, air flows upwardly in the evaporator 21, the condensed water cannot drop directly with the weight of its own, but will flow down along the surface of the evaporator 21. Thereafter, when a mass of the condensed water gathering at the lower end portion 32 of the evaporator 21 has grown to be larger than a certain degree, the condensed water flows downwardly along the outside surface of the drain guide member 33b on the right side in FIG. 7, and repeats an intermittent downward draining motion. As a result, the condensed water running downwardly along the drain guide member 33b reaches the bottom surface 30a of the lower casing 30 (actually, the upper surface of the insulator 44), then flows smoothly along the inclined bottom surface 30a and flows into the condensed water-drain pipe 29 from which the condensed water is discharged to the outside of the passenger compartment.

When the mass of the condensed water gathering at the lower end portion 32 of the evaporator 21 becomes larger than a certain degree, the condensed water flows also along the surface of the drain guide member 33b on the left side in FIG. 7. The condensed water reaches the upper surface of the connecting plate 33c, flows downwardly into the drain hole 43, and then reaches the bottom surface 30a located just between the partition member 33a and the drain guide member 33b. The condensed water flows along the inclination of the bottom surface 30a to the right side in FIGS. 7 and 8, then flows into the drain pipe 29 from the drain hole 43. Therefore, the condensed water is discharged smoothly to the outside of the passenger compartment. Further, the condensed water flowing along the surface of the drain guide member 33b on the left side in FIG. 7 can reach to the upper surface of the connecting plate 33c. Because the connecting plate 33c is inclined as shown in FIG. 8, the condensed water gathers to the lower end portion of inclination, thereafter dropping into the drain hole 41 located at the lowermost (on the right side) position in FIG. 8. Then, the condensed water runs to the right side in FIGS. 7 and 8 along the inclination of the bottom surface 30a, and then flows into the drain pipe 29 through the water drain hole 43 to be discharged smoothly to the outside of the passenger compartment.

In the first embodiment, the evaporator 21 is disposed in the lower casing 30 in such a manner that a part of the tank portion 21e forms the lower end portion 32; and therefore, the behavior of the condensed water differs greatly from that in a conventional air-conditioning apparatus. As the investigation result by the present inventors, since the tank portion 21e is complicated in outside shape as compared with the core portion 21h as shown in FIG. 4, the condensed water is hard to be collected at the lower end portion 32 of the evaporator 21 to be hardly discharged, and is readily blown off like. However, in the first embodiment, the lower space 50 is separated by the partition member 33a into the blown-air space 50a and the drain space 33b, and the drain guide member 33a is covered with the partition member 33a formed by a single uninterrupted plate (i.e., a single plate). Therefore, it is possible to prevent air flowing upwardly in the evaporator 21 from hitting against the lower end portion 32 where the condensed water is gathered. Consequently, the condensed water is rapidly gathered to the lower end portion 32 of the evaporator 21 entirely without being affected by the flow of air, and can be discharged to the bottom surface 30a through drain guide member 33b. Thus, condensed-water draining efficiency can be improved.

Further, in the first embodiment, the drain guide member 33b is not disposed under the core portion 21h, but is disposed under the tank portion 20e. It is, therefore, possible to prevent a decrease in the volume of air by the partition member 33a. Also, when the evaporator 21 is disposed within the lower casing 30, the upper end portion 37 elastically deforms to contact the tank portion 21e of the evaporator 21 and to seal therebetween. Therefore, it is possible to prevent air from hitting the lower end portion 32 of the evaporator 21. Consequently, the condensed water that has been gathered at the lower end portion 32 of the evaporator 21 can be discharged rapidly by the drain guide member 33b, and easily drips to the bottom surface 30a to improve the condensed-water drain efficiency.

When a pressure of air passing through the evaporator 21 is low (i.e., the volume of air passing through the evaporator 21 is small), or when entirely no air flows in the evaporator 21, the condensed water may sometimes drip into the air-blown space 50a at the left side in FIG. 7. Even in this case, the condensed water can be discharged sufficiency in the first embodiment.

That is, the condensed water dripped into the air-blown space 50a drips to the bottom surface 30a of the lower casing 30. Because of the inclination of the bottom surface 30a, the condensed water flows to the right side in FIG. 9. Then, the condensed water flows into the condensed-water drain pipe 29 through the recess portions 42 and 43. Because the recess portions 42 and 43 and the bottom surface 30a (i.e., the upper surface of the insulator 44) form a drain passage 60, condensed water is introduced into the condensed-water drain pipe 29 through the recess portions 42, 43. That is, the condensed water dripped to the air-blown space 50a is introduced into the drain space 50b through the drain passage 60. Therefore, the condensed water that has been dripped into the air-blown space 50a can also be discharged smoothly to the outside through the condensed-water drain pipe 29.

The upper end portion 37 of the partition member 33a is disposed to be proximate to a border (in the first embodiment, near the tank portion 21e) between the core portion 21h of the evaporator 21 and the tank portion 21e. Therefore, it is possible to prevent air from hitting the tank portion 21e without reducing the volume of air passing through the core portion 21h. Thus, the condensed-water draining efficiency can be improved without decreasing the cooling capacity of the evaporator 21.

Furthermore, according to the first embodiment of the present invention, the drain guide member 33b is not necessarily required to contact the tank portion 21e, and the provision of a clearance is allowed within a range in which the condensed water can drip sufficiency from the lower end portion 32 of the evaporator 21. In such a structure, however, the clearance may be increased because of an assembling error when the evaporator 21 is disposed in the lower casing 30, and a trouble that the condensed water can not be guided by the drain guide member 33b to the bottom surface 30a may be caused. However, in the first embodiment, the upper end portion 38 elastically deformed is formed in the drain guide member 33b. Therefore, the upper end portion 38 is elastically deformed to contact the tank portion 21e, thereby enabling sufficiently guiding the condensed water to the bottom surface 30a notwithstanding the assembling error of the evaporator 21 and the manufacturing tolerance of the evaporator 21 itself.

Further, in the first embodiment, the upper end portion 37 of the partition member 33a and the upper end portion 38 of the drain guide member 33b are used as a base for supporting the evaporator 21. It is, therefore, possible to hold the evaporator 21 within the lower casing 30 by the upper end portion 37 of the partition member 33a and the upper end portion 38 of the drain guide member 33b notwithstanding the assembling error of the evaporator and the manufacturing tolerance of the evaporator 21 itself.

Further, in the first embodiment, the partition plate 33aand the drain guide member 33b may be separately formed. In this case, however, it becomes necessary to respectively assemble the partition member 33a and the drain guide member 33b to the lower casing 30. In the first embodiment, for purpose of improving the assembling efficiency, the partition plate 33a and the drain guide member 33b are integrally connected by the connecting portion 33c.

Figure 10:
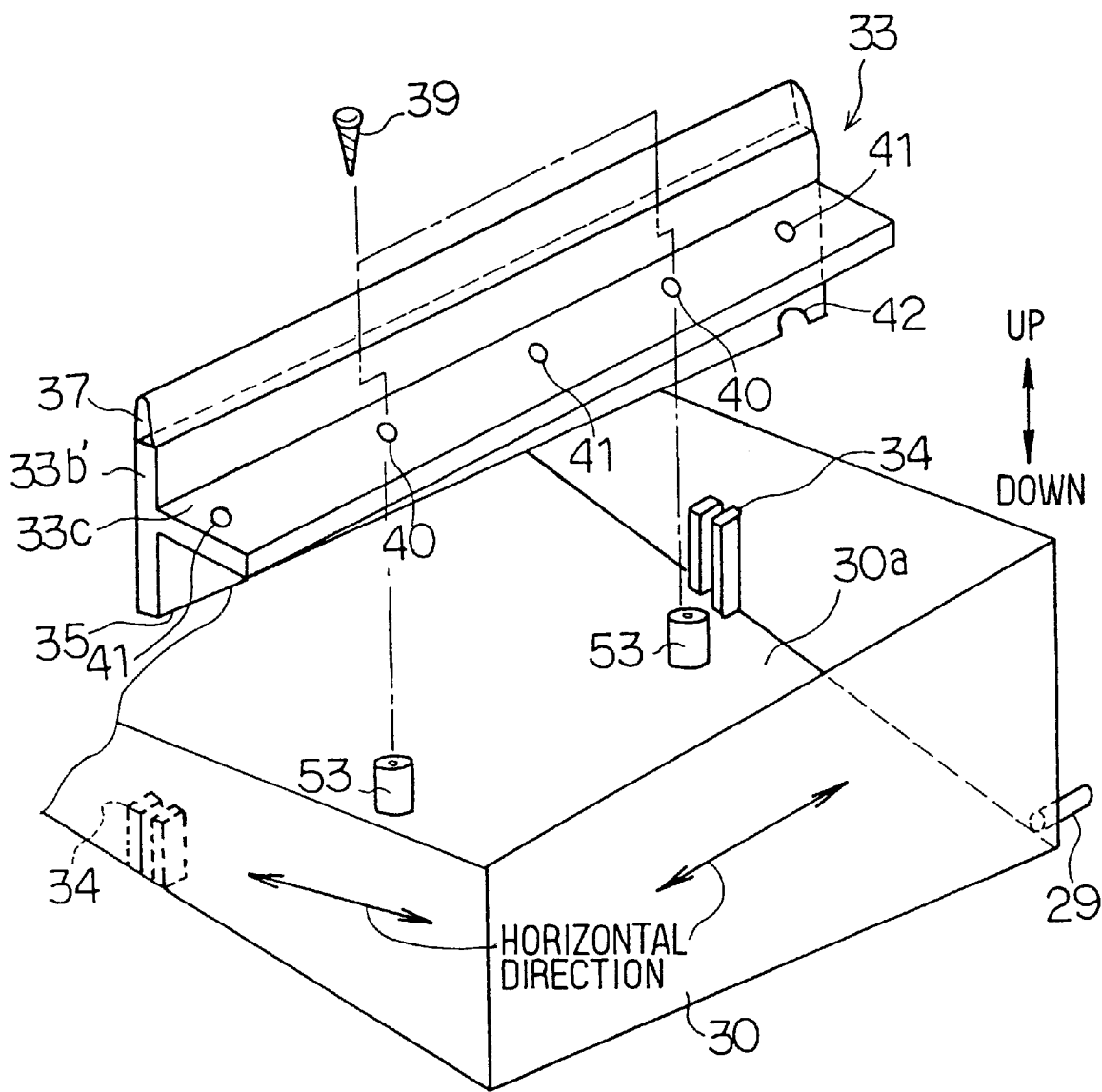
FIG. 10 is a disassembled view showing a drain-improving portion and a lower casing according to a second preferred embodiment of the present invention.

A second preferred embodiment of the present invention will be now described with reference to FIGS. 10 and 11.

In the second embodiment, the drain-improving portion 33 is different to that in the first embodiment, the other portions are similar to those in the first embodiment.

In the second embodiment, the drain-improving portion 33 is not provided with the drain guide member 33b in FIG. 6 in the first embodiment. That is, in the second embodiment, the partition plate 33a of the first embodiment is used as a drain guide member for guiding the condensed water to the bottom surface 30a as shown in FIGS. 10, 11. FIG. 10 is a view corresponding to FIG. 6, and FIG. 11 is a view corresponding to FIG. 7. As shown in FIGS. 10 and 11, in the second embodiment, a drain guide member 33b' is disposed at the arrangement position of the partition plate 33a in the first embodiment.

Figure 11:
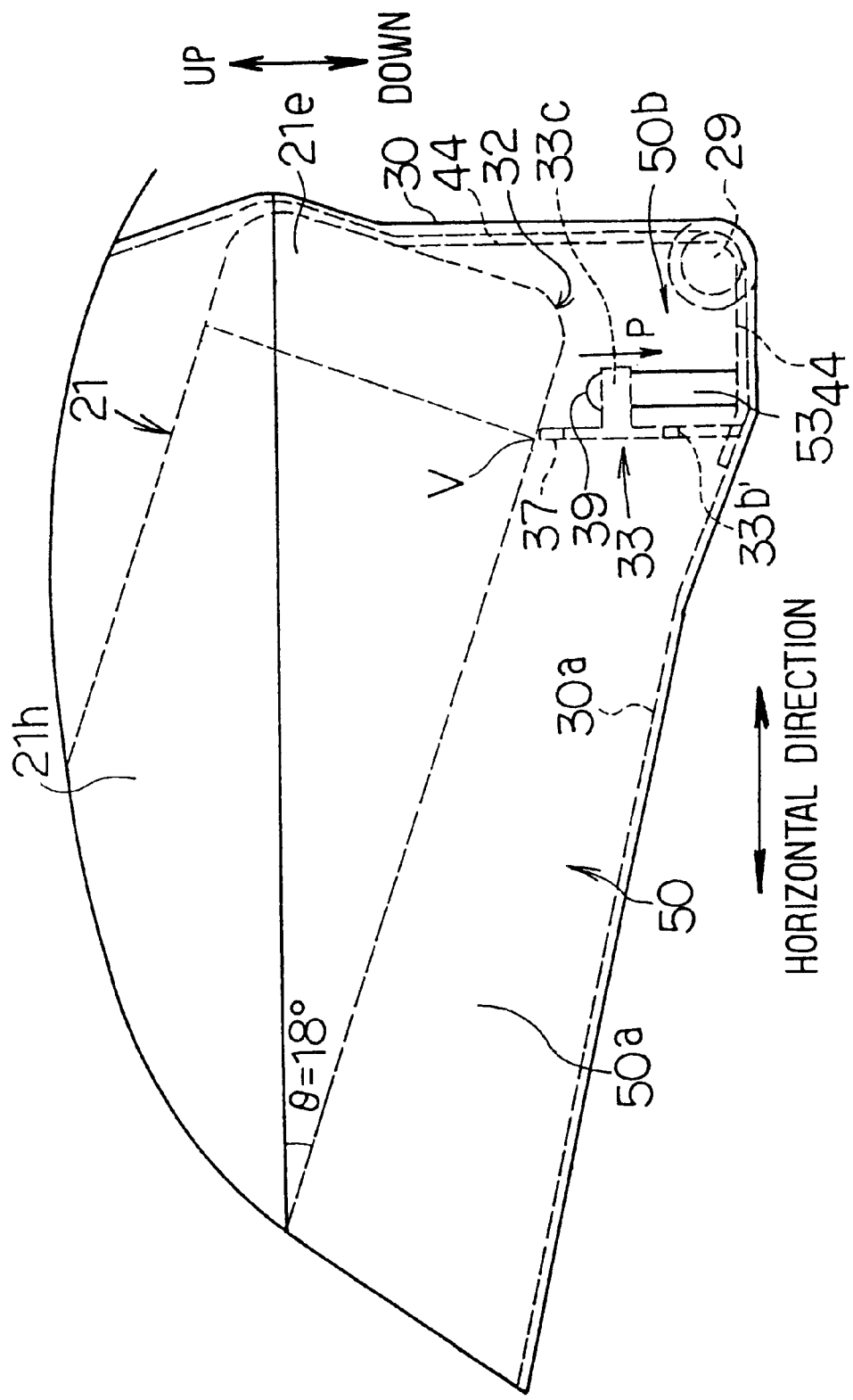
FIG. 11 is a perspective view showing the drain-improving portion disposed in the lower casing according to the second embodiment.

The drain guide member 33b' shown in FIG. 11 is disposed to contact the lower surface of the tank portion 21e of the evaporator 21; particularly, the upper end portion 37 elastically deformed of the drain guide member 33b' is disposed to approximately contact the boundary V between the core portion 21h and the tank portion 21e.

Because the drain guide member 33b' is disposed on the underside of the tank portion 21e, the drain guide member 33b' does not disturb the flow of air passing through the core portion 21h of the evaporator 21. Therefore, it is possible to increase the air volume when the passenger compartment is cooled with a large volume of air, for instance in summer, and to fully display the cooling capacity of the evaporator 21.

In the second embodiment, the drain guide member 33b' is disposed to approximately contact the boundary V, and the angle of inclination θ of the evaporator 21 is 18 deg. similarly to the first embodiment, the condensed water comes as far as the lower end portion 32 of the inclined evaporator 21, and flows downwardly as indicated by the arrow P in FIG. 11

On the other hand, since the drain guide member 33b' is disposed to contact the boundary V, the condensed water is guided downwardly also from the boundary V by the drain guide member 33b'. The condensed water flowing along the drain guide member 33b' reaches the bottom surface 30a of the lower casing 30, then flows smoothly into the condensed-water drain pipe 29 along the inclination of the bottom surface 30a, and is discharged to the outside of the passenger compartment.

Here, the condensed water is guided downwardly also to the plate surface on the inclination upper end side of the drain guide member 33b' on the left side in FIG. 11. When the pressure of air passing through the evaporator 21 is little (when the volume of air passing through the evaporator 21 is small), or when entirely no air flows, the condensed water sometimes drips into the air-blown space 50a on the left side in FIG. 11. Even in this case, the condensed water can be discharged smoothly to the outside of the vehicle.

Since the drain passage 60 extending until the condensed-water drain pipe 29 is formed by the recess portion 42 and the bottom surface 30a (actually, the upper surface of the insulator 44), the condensed water dropped to the air-blown space 50a is introduced into the drain space 50b through the drain passage 60, and can also be discharged smoothly from the condensed-water drain pipe 29 to the outside of the vehicle.

The drain guide member 33b' of the second embodiment is formed in a plate-like uninterruptedly extending for the entire range in the longitudinal direction of the tank portion 21e. Therefore, air blown by the blower 14 becomes hard to hit against lower end side of the drain guide member 33b, where the condensed water flows down. Therefore, the condensed water can be rapidly guided without being affected by the air flow, and drips to the bottom surface 30a of the lower casing 30. Consequently, the condensed-water draining efficiency can be improved.

Further, second embodiment, since the lower space 50 is divided by the drain guide member 33' into the air-blown space 50a and the drain space 50b, it is possible to fully prevent the air from hitting against the lower end portion 32 of the inclined evaporator 21, where the condensed water gathers. Thus, the condensed water that has been gathered at the lower end portion 32 of the evaporator 21 can be rapidly dripped entirely without being affected by the air blown by the blower, resulting in further improved condensed-water draining efficiency.

Figure 12:
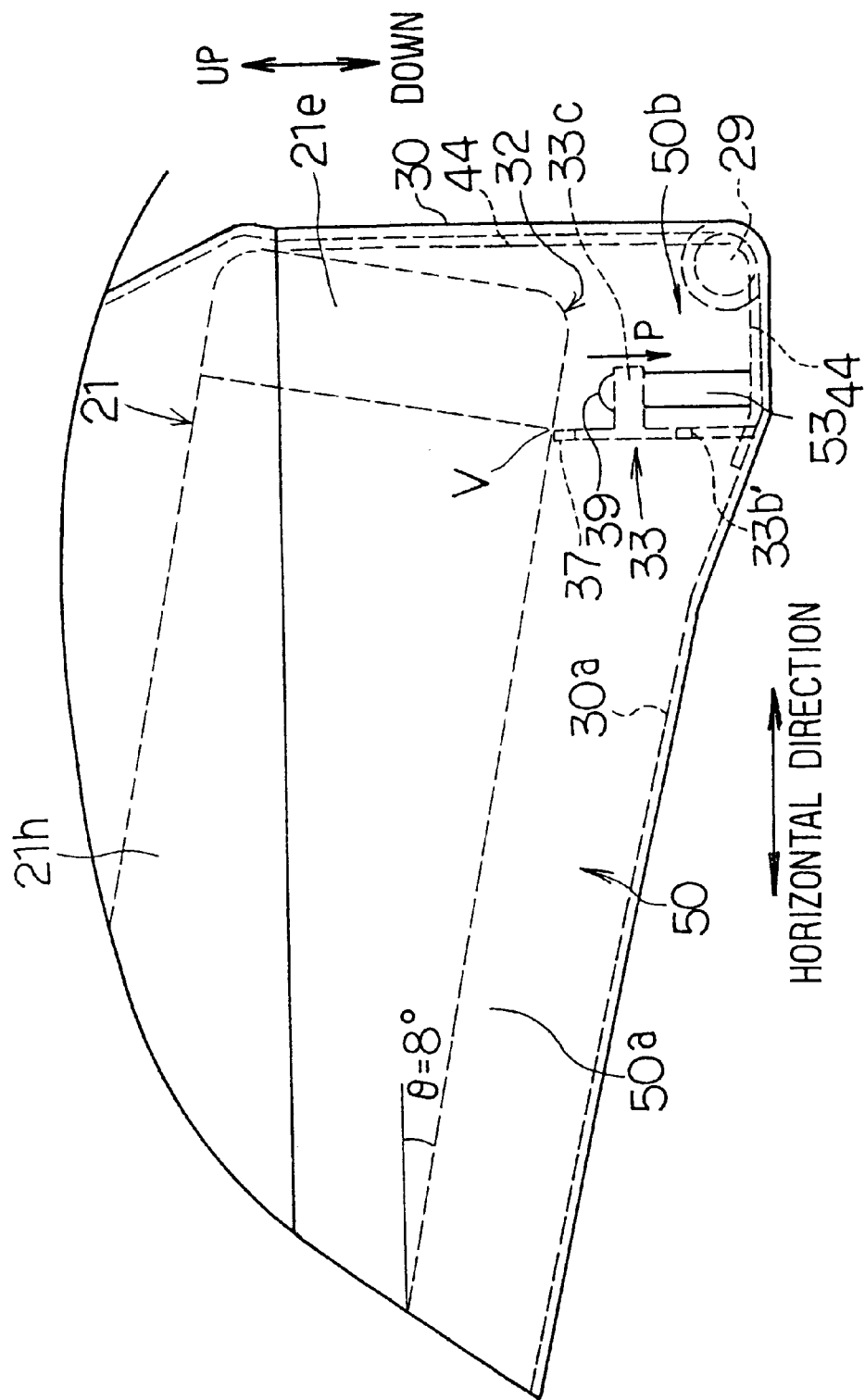
FIG. 12 is a perspective view showing a drain-improving portion disposed in the lower casing according to a third preferred embodiment of the present invention.

A third preferred embodiment of the present invention will be now described with reference to FIG. 12.

In an air-conditioning apparatus of the third embodiment, the inclination angle θ of the evaporator 21 is 8 deg., that is smaller than that in the second embodiment.

That is, third embodiment, the inclination angle θ is set at 8 deg., to decrease the vertical size of the air-conditioning apparatus. In this case, the condensed water does not flow downwardly as far as the lower end portion 32 of the tank portion 21e along the surface of the evaporator 21 like in the first embodiment, but drips downwardly just at the boundary V between the tank portion 21e and the core portion 21h of the evaporator 21.

Because the tank portion 21e of the evaporator 21 has a complicated uneven outside shape, the condensed water that flowing downwardly along the surface (the part contacting the air) of the core portion 21h can not flow over the uneven surface of the tank portion 21. Therefore, when air flows in the core portion 21h, most of the condensed water is collected to the boundary V by the air pressure. Then, when the amount of the condensed water is increased and reaches a certain predetermined value, the condensed water drips downwardly with the weight of its own or is blown off upwardly in a case of large air volume (high air flow rate).

In the third embodiment, the drain guide member 33b' is disposed to contact the boundary V. Therefore, the condensed water dripped from the boundary V flows downwardly along the outside surface (at right and left surfaces in FIG. 12) of the drain guide member 33b'. Consequently, the condensed water that flows along the drain guide member 33b' comes to the bottom surface 30a of the lower casing 30, then flows smoothly along the inclined bottom surface 30a toward the condensed-water drain pipe 29, to be discharged at the outside of the passenger compartment. It is, therefore, possible to decrease the vertical size of the air-conditioning apparatus and also to sufficiently guide the condensed water downwardly by the drain guide member 33b'.

A fourth preferred embodiment of the present invention will be now described.

Figure 13:
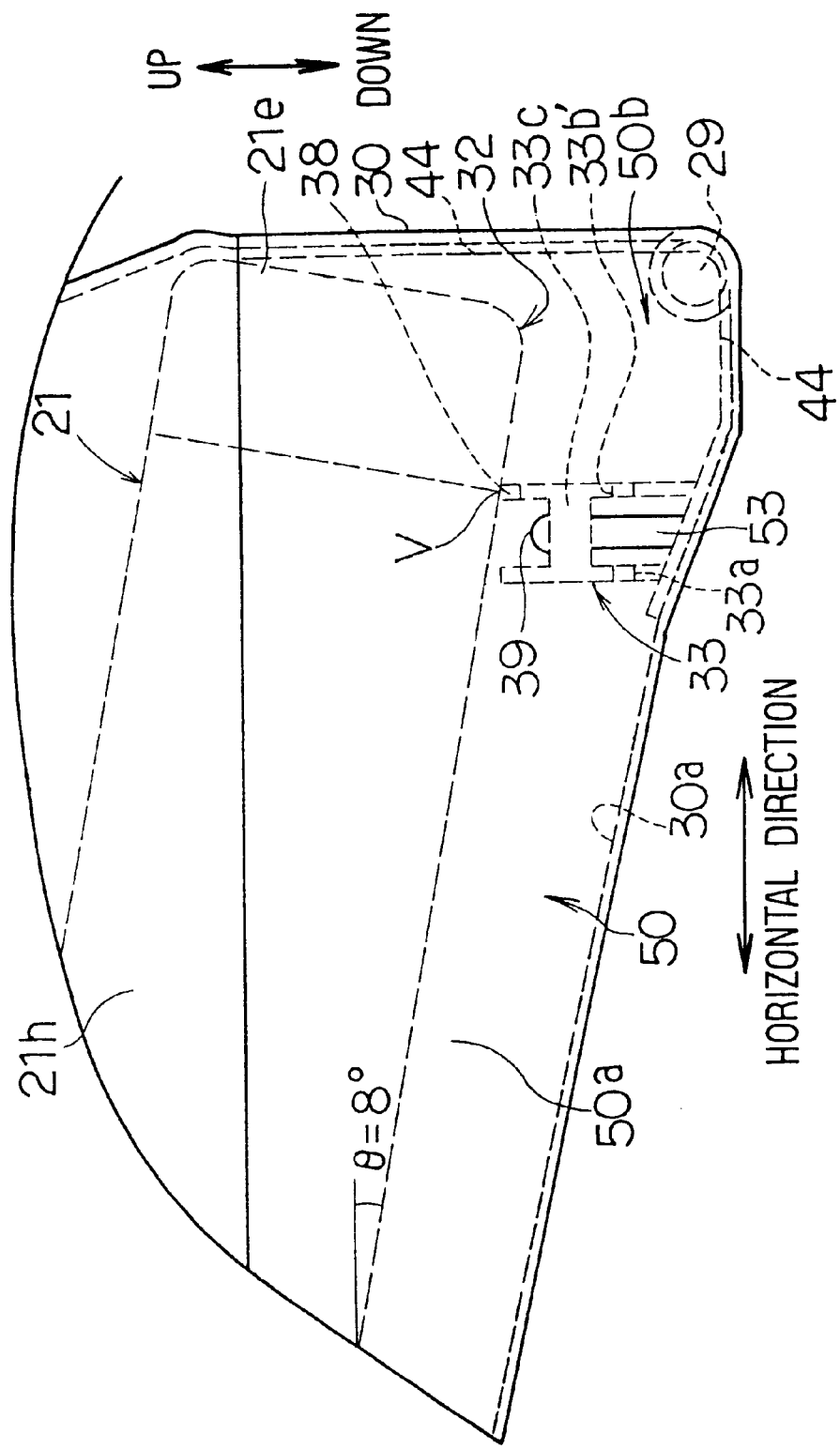
FIG. 13 is a perspective view showing a drain-improving portion disposed in the lower casing according to a fourth preferred embodiment of the present invention.

In the fourth embodiment, as shown in FIG. 13, the partition member 33a which prevents air from striking against the drain guide member 33b' in the third embodiment is provided. As shown in FIG. 13, in the fourth embodiment, the arrangement position of the drain-improving portion 33 of the first embodiment is shifted to the upper end side (i.e., left side in FIG. 13) of inclination. However, in the fourth embodiment, the upper end portion 37 elastically deformed is not formed at the upper end of the partition member 33a, and a clearance is provided between the upper end of the partition member 33a and the core portion 21h so that air can pass through all the core portion 21h of the evaporator 21.

The drain-improving portion 33 in the fourth embodiment can prevent air from easily hitting against the condensed water that is gathered at the boundary V. Therefore, the condensed water can smoothly be guided downwardly by the drain guide member 33b' without being blown off.

The fourth embodiment of such a constitution, therefore, has the following advantages as compared with the third embodiment. That is, if the inclination angle θ in the third embodiment is decreased, the condensed water may not smoothly gather to the boundary V, and the condensed water gathering in the vicinity of the boundary V can be blown off by the flow of air. However, in the fourth embodiment, the inclination angle θ can be made smaller than that in the third embodiment by adopting the partition member 33a that prevents air from easily hitting on the vicinity of the boundary V and on the drain guide member 33b'.

Figure 14:
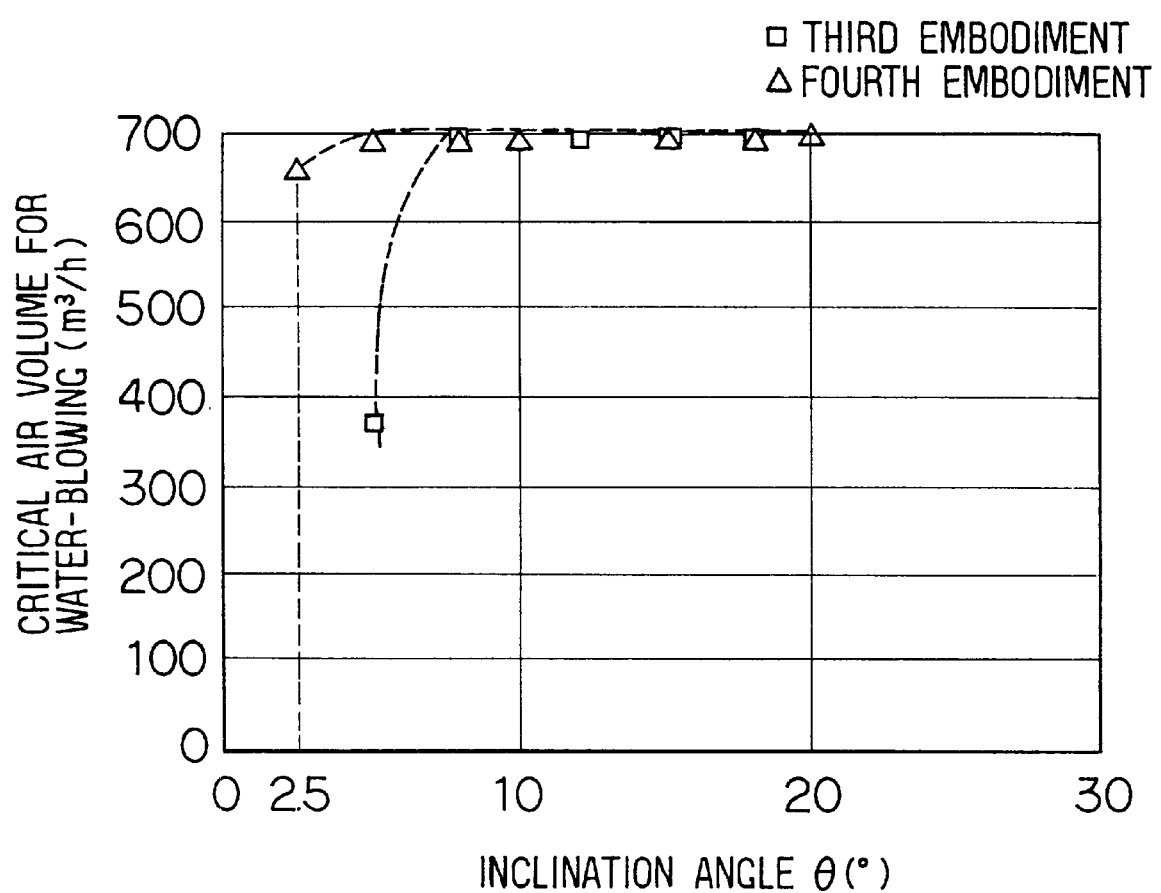
FIG. 14 is a graph showing the relationship between a critical air volume for water-blowing and an inclination angle of an evaporator in the third and fourth embodiments.

FIG. 14 shows experimental data obtained by measuring the critical air volume, by using the inclination angle θ, at which the condensed water is blown (hereinafter referred to as "critical air volume for water-blowing). In the fourth embodiment, as shown in FIG. 14, if the inclination angle θ is 2.5 deg., it is possible to keep the critical air volume for water-blowing nearly equivalent to the inclination angle θ of 20 deg., for example. Thus, in the fourth embodiment, the inclination angle θ of the evaporator 21 can be set at a small degree, and the vertical size of the air-conditioning apparatus can be reduced, as compared with third embodiment.

A fifth preferred embodiment of the present invention will be now described with reference to FIG. 15.

Figure 15:
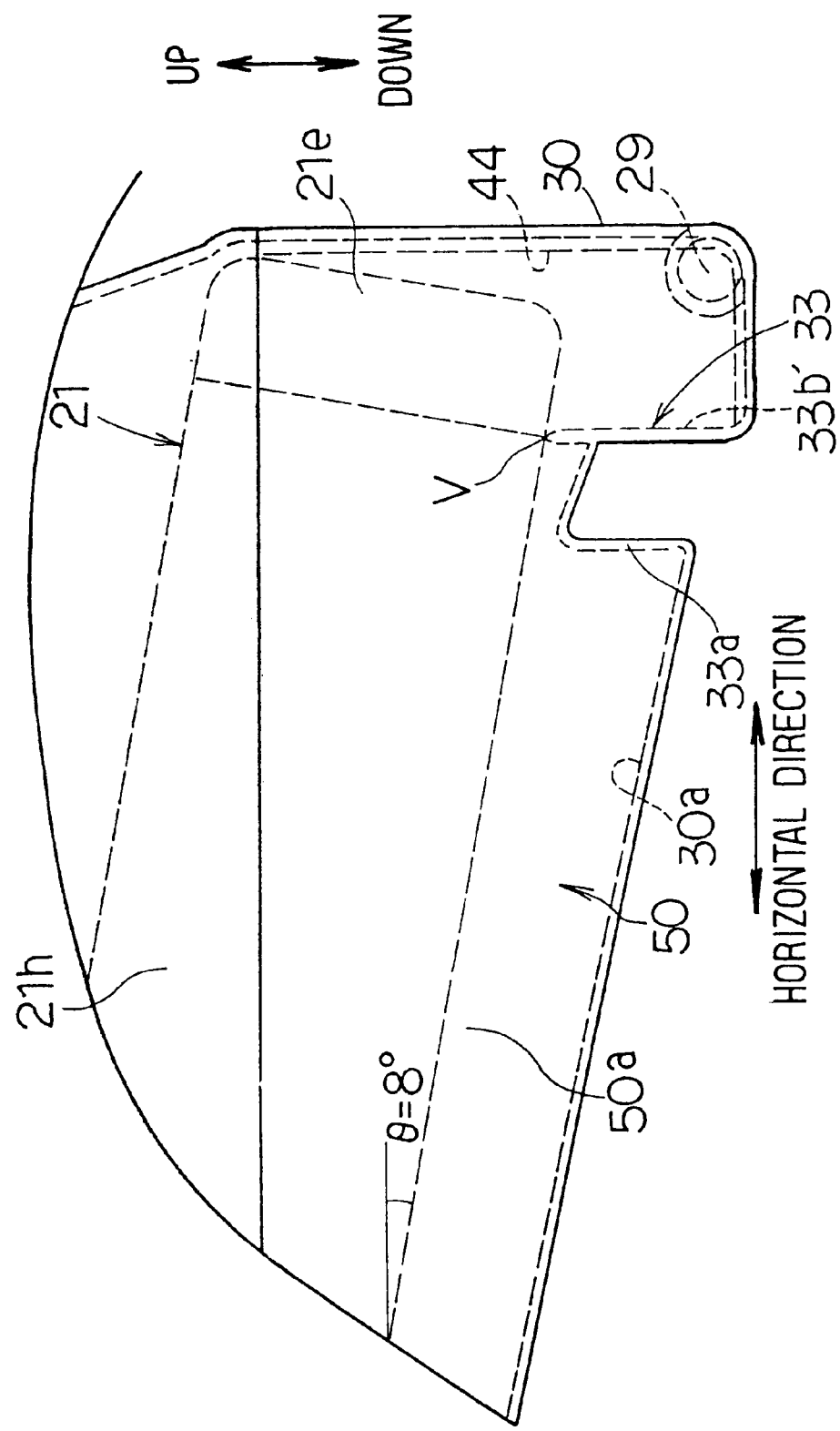
FIG. 15 is a perspective view showing a drain-improving portion disposed in the lower casing according to a fifth embodiment of the present invention.

In the fourth embodiment, the drain-improving portion 33 is separate from the lower casing 30 but may be formed integrally with the lower casing 30 as shown in FIG. 15. That is, in the fifth embodiment, as shown in FIG. 15, the lower casing 30 is formed to have the drain-improving portion 33 in the fourth embodiment. Therefore, in the fifth embodiment, the assembling step of the drain-improving portion 33 to the lower casing 30 can be omitted, while the draining-performance of the condensed water is improved.

A sixth preferred embodiment of the present invention will be now described.

Figure 16:
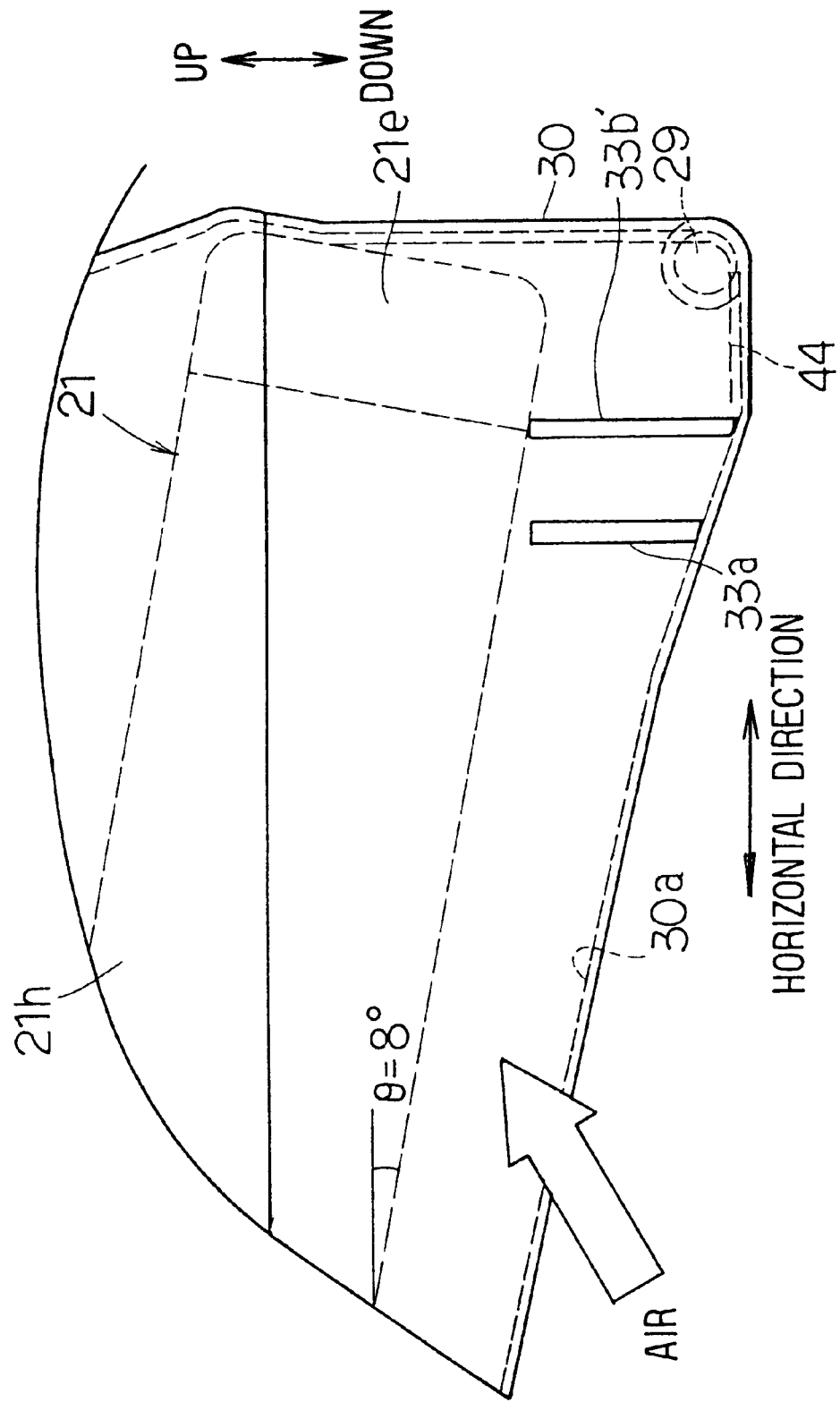
FIG. 16 a perspective view showing a drain-improving portion disposed in the lower casing according to a sixth preferred embodiment of the present invention.
Figure 17:
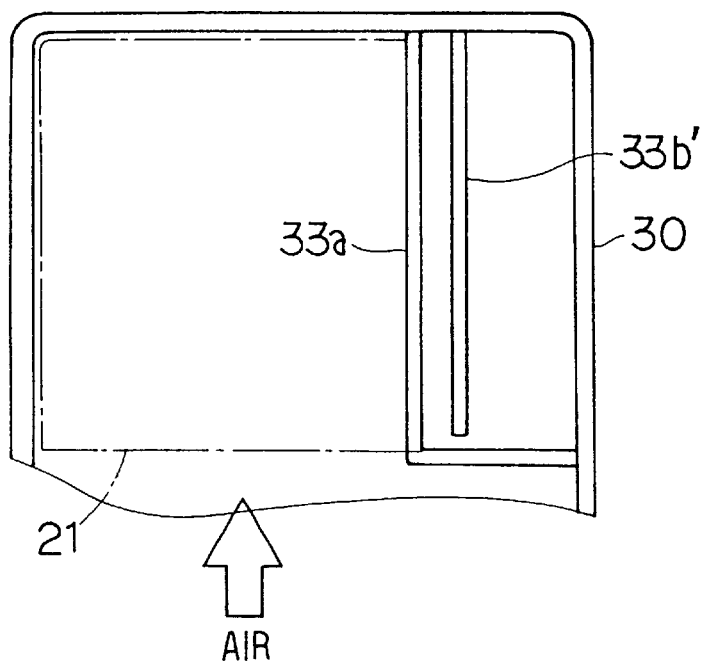
FIG. 17 is a top view of FIG. 16.

In each of the above-described embodiments, air blown by the blower unit 1 flows from the inclination upper end side of the evaporator 21 towards the inclination lower end side thereof, and then passes through the evaporator 21 upwardly. However, air can pass through the evaporator 21 after flowing in the lamination direction of the tube 21f as shown in FIG. 16 and FIG. 17. In this case, however, the partition member 33a is formed in an L shape as shown in FIG. 17 so that the air will not hit on the tank portion 21e. By providing the L-shaped partition member 33a in the sixth embodiment, the critical air volume for water-blowing can be increased in the same inclination angle θ.

Figure 18:
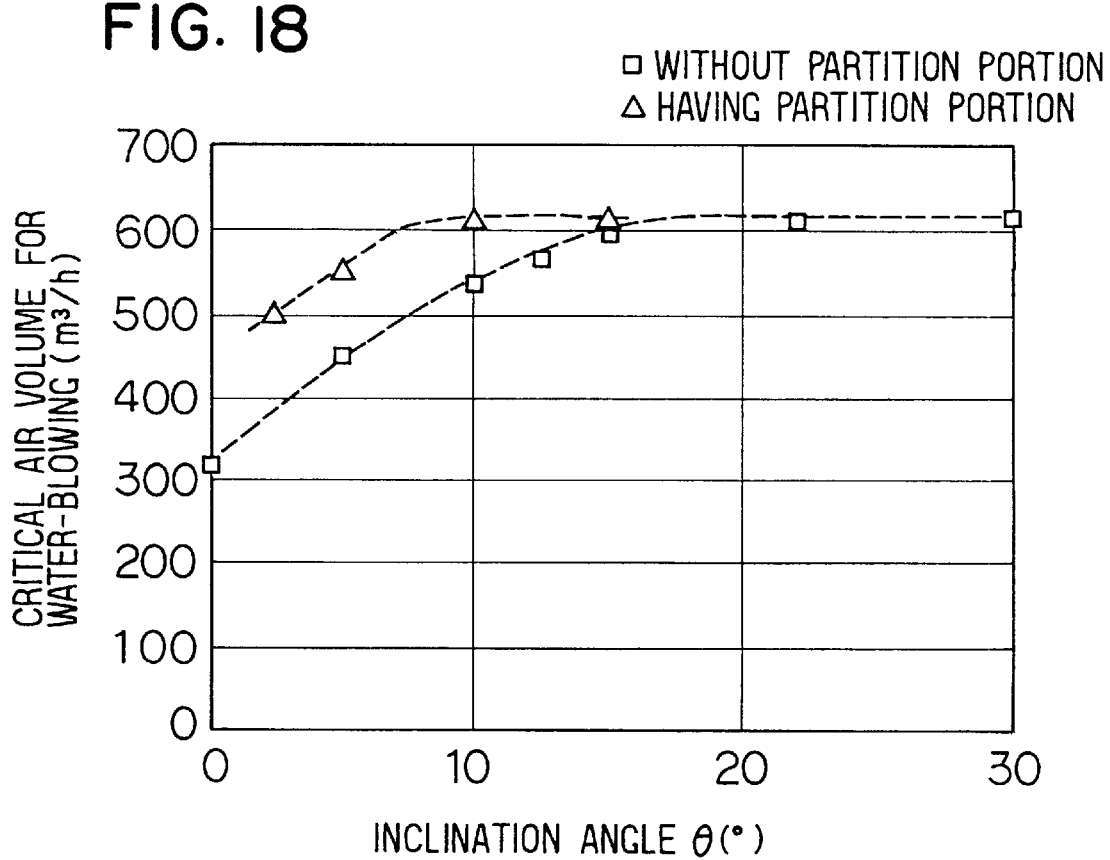
FIG. 18 is a graph showing the relationship between a critical air volume for water-blowing and an inclination angle of an evaporator when a partition member is provided and when the partition member is not provided, according to the sixth embodiment.

As shown in FIG. 18, when the critical air volume for water-blowing is the same, the inclination angle θ can be decreased by the partition member 33a. Thus, the vertical size of the air-conditioning apparatus can be reduced even in a case where air flows as shown in FIGS. 16, 17.

Although the present invention has been fully described in connection with the preferred embodiments thereof with reference to the accompanying drawings, it is to be noted that various changes and modifications will become apparent to those skilled in the art.

For example, in each of the above-described embodiments, the evaporator 21 is a laminated type, but it is noted that the type of the evaporator is not limited thereto and may be a serpentine type with a multi-porous flat tube bent in a snakelike shape and combined with corrugated fins.

In above-described first embodiment, the elastically deformed upper end portion 37 is formed in the partition member 33a, and the elastically deformed upper end portion 38 is formed in the drain guide member 33b; however, at least one of them is sufficient, or both of them may be dispensed.

I each of the above-described embodiments, the drain-improving portion 33 is formed of resin, but the drain-improving portion 33 may be formed of an elastically deformable material such as rubber.

In the above-described embodiments, the elastically deformed upper end portions 37, 38 are formed of an elastomer rubber, but the upper end portions 37, 38 of the partition plate 33a and the drain guide member 33b may be formed thin to be readily elastically deformed.

In each of the above-described embodiments, the evaporator 21 is disposed so that the tank portion 21e forms the lower end portion 32. The present invention, however, is applicable to an air-conditioning apparatus having a single-tank type evaporator in which a tank portion is disposed only at the upper end portion of the inclined evaporator. Furthermore, the present invention is applicable to an air-conditioning apparatus having a single-tank type evaporator in which the tank portion is disposed at the lower end portion of the inclined evaporator.

In each of the above-described embodiments, a flow-control reheat system having a hot water control valve is used as the temperature control means to control the quantity of hot water to be supplied to the heater core 22. The present invention is also applicable to an air mixing-type system in which an air mixing damper is employed for controlling the air mixing ratio, that is, a ratio between an amount of air passing through the heater core 22 and an amount of air bypassing the heater core 22. In each of the above-described embodiments, the air-conditioning apparatus for a vehicle according to the present invention has been explained, but it should be noticed that the present invention is not limited thereto.

In the above-described first embodiment, the partition plate 33a is disposed to contact the evaporator 21 to divide the lower space 50 into the air-blown space 50a and the drain space 50b; however, there may be provided a slight clearance therebetween.

In the above-described first embodiment, the drain guide member 33b is disposed to contact the evaporator 21; however, there may be provided a slight clearance therebetween. Furthermore, the partition member 33a is disposed nearly in line with the border V, but may be shifted by a little. For example, a partition member may be shifted by 5 mm from the border V towards the inclination upper end side or the inclination lower end side of the evaporator.

Furthermore, in the above-described second to sixth embodiments, the drain guide member 33b' is disposed nearly in line with the border V. However, the drain guide member 33b may be shifted a little, for example 5 mm, away from the border V towards the inclination upper end side or the inclination lower end side of the evaporator.

Such changes and modifications are to be understood as being within the scop of the present invention as defined by the appended claims.

What is claimed is:

1. An air-conditioning apparatus comprising:

an air-conditioning case forming an air passage;

a cooling heat exchanger for cooling air passing therethrough, said cooling heat exchanger being disposed in said air-conditioning case obliquely relative to a horizontal direction to have an inclined bottom surface, and to form a lower space below said bottom surface of said cooling heat exchanger within said air-conditioning case;

a drain guide member for guiding condensed water generated on said cooling heat exchanger to an inner bottom of said air-conditioning case, said drain guide member being disposed in said lower space to approximately contact a lower end side of said inclined bottom surface of said cooling heat exchanger; and a partition member disposed in said lower space at an upper end side of said inclined bottom surface from said drain guide member, said partition member extending in an arrangement direction of said drain guide member to cover said drain guide member, wherein said partition member is a solid plate continuously extending in the arrangement direction of said drain guide member.

2. The air-conditioning apparatus according to claim 1, wherein said cooling heat exchanger is disposed in said air-conditioning case in such a manner that air flows through said cooling heat exchanger upwardly from said inclined bottom surface thereof.

3. The air-conditioning apparatus according to claim 1, wherein:

said lower space within said air-conditioning case has a drain passage for leading the condensed water, dropped to an upper end side of said inclined bottom surface from said partition member, toward said drain guide member; and said drain passage is formed by a lower end of said partition member and said inner bottom of said air-conditioning case.

4. The air-conditioning apparatus according to claim 1, wherein said partition member and said drain guide member are integrally formed.

5. The air-conditioning apparatus according to claim 1, wherein:

said partition member is disposed in said lower space to separate said lower space into an air-blown space through which air flows, and a drain space for guiding the condensed water;

said air-blown space is provided at an upper end side of said inclined bottom surface of said cooling heat exchanger from said partition member;

said drain space is provided at a lower end side of said inclined bottom surface of said cooling heat exchanger from said partition member; and said drain guide member is disposed in said drain space.

6. The air-conditioning apparatus according to claim 5, wherein said drain space is formed by said air-conditioning case, said partition member and a lower end portion of said inclined bottom surface of said cooling heat exchanger.

7. An air-conditioning apparatus comprising:

an air-conditioning case forming an air passage;

a cooling heat exchanger for cooling air passing therethrough, said cooling heat exchanger in said air-conditioning case obliquely relative to a horizontal direction to have an inclined bottom surface, and to form a lower space below said bottom surface of said cooling heat exchanger within said air-conditioning case;

a drain guide member for guiding condensed water generated on said cooling heat exchange to an inner bottom of said air-conditioning case, said drain guide member being disposed in said lower space to approximately contact a lower end side of said inclined bottom surface of said cooling heat exchanger; and a partition member disposed in said lower space at an upper end inclined bottom surface from said drain guide member, said partition member extending in an arrangement direction of said drain guide member to cover said drain guide member wherein:

said partition member is disposed in said lower space separate said lower space into an air-blown space through which air flows, and a drain space for guiding the condensed water;

said air-blown space is provided at an upper end side of said inclined bottom surface of said cooling heat exchanger from said partition member;

said drain space is provided at a lower end side of said inclined bottom surface of said cooling heat exchanger from said partition member;

said drain guide member is disposed in said drain space;

said drain space is formed by said air-conditioning case, said partition member and a lower end portion of said inclined bottom surface of said cooling heat exchange;

said drain guide member has a first end contacting said lower end portion of said inclined bottom surface of said cooling heat exchanger; and said first end of said drain guide member is formed by an elastic member that is elastically deformed to contact said lower end portion of said inclined bottom surface of said cooling heat exchanger.

8. An air-conditioning apparatus comprising:

an air-conditioning case forming an air passage;

a cooling heat exchanger for cooling air passing therethrough said cooling heat exchanger being disposed in said air-conditioning case obliquely relative to a horizontal direction to have an inclined bottom surface, and to form a lower space below said bottom surface of said cooling heat exchanger within said air-conditioning case;

a drain guide member for guiding condensed water generated on said cooling heat exchanger to an inner bottom of said air-conditioning case, said drain guide member being disposed in said lower space to approximately contact a lower end side of said inclined bottom surface of said cooling heat exchanger; and a partition member disposed in said lower space at an upper end side of said inclined bottom surface from said drain guide member, said partition member extending in an arrangement direction of said drain guide member to cover said drain guide member wherein:

said partition member is disposed in said lower space to separate said lower space into an air-blown space through which air flows, and a drain space for guiding the condensed water;

said air-blown space is provided at an upper end side of said inclined bottom surface of said cooling heat exchanger from said partition member;

said drain space is provided at a lower end side of said inclined bottom surface of said cooling heat exchanger from said partition member;

said drain guide member is disposed in said drain space;

said drain space is formed by said air-conditioning case, said partition member and a lower end portion of said inclined bottom surface of said cooling heat exchanger;

said partition member has a second end contacting said lower end portion of said inclined bottom surface of said cooling heat exchanger; and said second end of said partition member is formed by an elastic member that is elastically deformed to contact said lower end portion of said inclined bottom surface of said cooling heat exchanger.

9. The air-conditioning apparatus according to claim 1, wherein:

said cooling heat exchanger includes
  a core portion having a plurality of laminated tubes in which refrigerant flows, and
  a tank, formed on at least one end side of said core portion, for distributing refrigerant to said tubes or for joining the refrigerant from said tubes;
  said cooling heat exchanger is inclined relative to the horizontal direction of said air-conditioning casein such a manner that said tank is positioned at a lower side in inclination; and
  said drain guide member is disposed under said tank to approximately contact a bottom of said tank.

10. The air-conditioning apparatus according to claim 9, wherein said partition member is disposed to be approximately adjacent to a boundary between said core portion and said tank.

11. The air-conditioning apparatus according to claim 9, wherein said partition member is disposed to approximately contact a boundary between said core portion and said tank.

12. An air-conditioning apparatus comprising:

an air-conditioning case forming an air passage;

a cooling heat exchanger for cooling air passing therethrough, said cooling heat exchanger being disposed in said air-conditioning case obliquely relative to a horizontal direction to have an inclined bottom surface, and to form a lower space below said inclined bottom surface of said cooling heat exchanger within said air-conditioning case; and a drain guide member for guiding condensed water generated on said cooling heat exchanger to an inner bottom of said air-conditioning case, said drain guide member being disposed in said lower space to approximately contact a lower end side of said inclined bottom surface of said cooling heat exchanger, wherein:

said cooling heat exchanger includes
  core portion having a plurality of laminated tubes in which refrigerant flows, and
  a tank, formed on at least one end side of said core portion, for distributing refrigerant to said tubes or for joining the refrigerant from said tubes;
  said cooling heat exchanger is inclined relative to a horizontal direction in said air-conditioning case in such a manner that said tank is positioned at a lower side in inclination; and wherein
  said drain guide member approximately contacts only a bottom of said tank and not said core.

13. The air-conditioning apparatus according to claim 12, wherein said cooling heat exchanger is disposed in said air-conditioning case in such a manner that air flows through said cooling heat exchanger upwardly from said inclined bottom surface thereof.

14. The air-conditioning apparatus according to claim 12, wherein said drain guide member is disposed to be approximately proximate to a boundary between said core portion and said tank.

15. The air-conditioning apparatus according to claim 12, wherein said drain guide member extends in approximately whole length of said tank in a longitudinal direction of said tank.

16. The air-conditioning apparatus according to claim 15, wherein:

said lower space within said air-conditioning case has a drain passage for leading the condensed-water, dropped to an upper end side of said inclined bottom surface from said drain guide member, toward a lower end side of said inclined bottom surface from said drain guide member; and said drain passage is formed by a lower end of said drain guide member and said inner bottom of said air-conditioning case.

17. The air-conditioning apparatus according to claim 15, wherein:

said drain guide member is disposed in said lower space to separate said lower space into an air-blown space through which air flows, and a drain space for guiding the condensed water;

said air-blown space is provided at an upper end side of said inclined bottom surface of said cooling heat exchanger from said drain guide member; and said drain space is provided at a lower end side of said inclined bottom surface of said cooling heat exchanger from said drain guide member.

18. The air-conditioning apparatus according to claim 15, further comprising a partition member disposed in said lower space at an upper end side of said inclined bottom surface from said drain guide member to be adjacent to said drain guide member, wherein said partition member extends in the longitudinal direction of said tank to form a predetermined clearance between said inclined bottom surface of said cooling heat exchanger and said partition member.

* * * * *